United States Patent [19]

Manabe

[11] Patent Number: 5,325,209
[45] Date of Patent: Jun. 28, 1994

[54] MULTIPLEX IMAGE FORMING APPARATUS

[75] Inventor: Yoshiharu Manabe, Yokohama, Japan

[73] Assignee: Ricoh Company, Ltd., Tokyo, Japan

[21] Appl. No.: 870,453

[22] Filed: Apr. 17, 1992

[30] Foreign Application Priority Data

Apr. 18, 1991 [JP] Japan ................................... 3-086485

[51] Int. Cl.$^5$ ........................................... H01H 71/00
[52] U.S. Cl. ..................... 358/437; 358/425; 355/202
[58] Field of Search .............. 358/401, 442, 468, 437, 358/439, 425; 355/202, 203, 204, 209, 271, 308, 133

[56] References Cited

U.S. PATENT DOCUMENTS

| 4,992,84 | 2/1991 | Sakata | 358/401 |
| 4,330,195 | 5/1982 | Lavallee | 355/3 R |
| 4,711,560 | 12/1987 | Hosaka et al. | 355/14 C |
| 4,839,698 | 6/1989 | Inuzuka et al. | 355/243 |
| 4,905,098 | 2/1990 | Sakata | 358/468 |

Primary Examiner—Bentsu Ro
Attorney, Agent, or Firm—Oblon, Spivak, McClelland, Maier & Neustadt

[57] ABSTRACT

A multiplex image forming apparatus remains in a standby state for multiple functions including a copier function, a facsimile function and a printer function at all times and, in a receive mode at night, fully deactivates devices to be not used, thereby saving power and reducing noise. The apparatus has a power source for a copier, and an application extending section capable of combining a facsimile function with the apparatus and a power source for a multiplex configuration for driving the application extending section. A first and a second power source switch is located at an input section preceding the two power sources. A detecting circuit is connected to the first power source switch to detect the turn-on and turn-off of the switch. Detection signal output control means transfers a detection signal from the detecting circuit to a control circuit only when the second power source switch is turned on and the first power source switch is turned off.

13 Claims, 22 Drawing Sheets

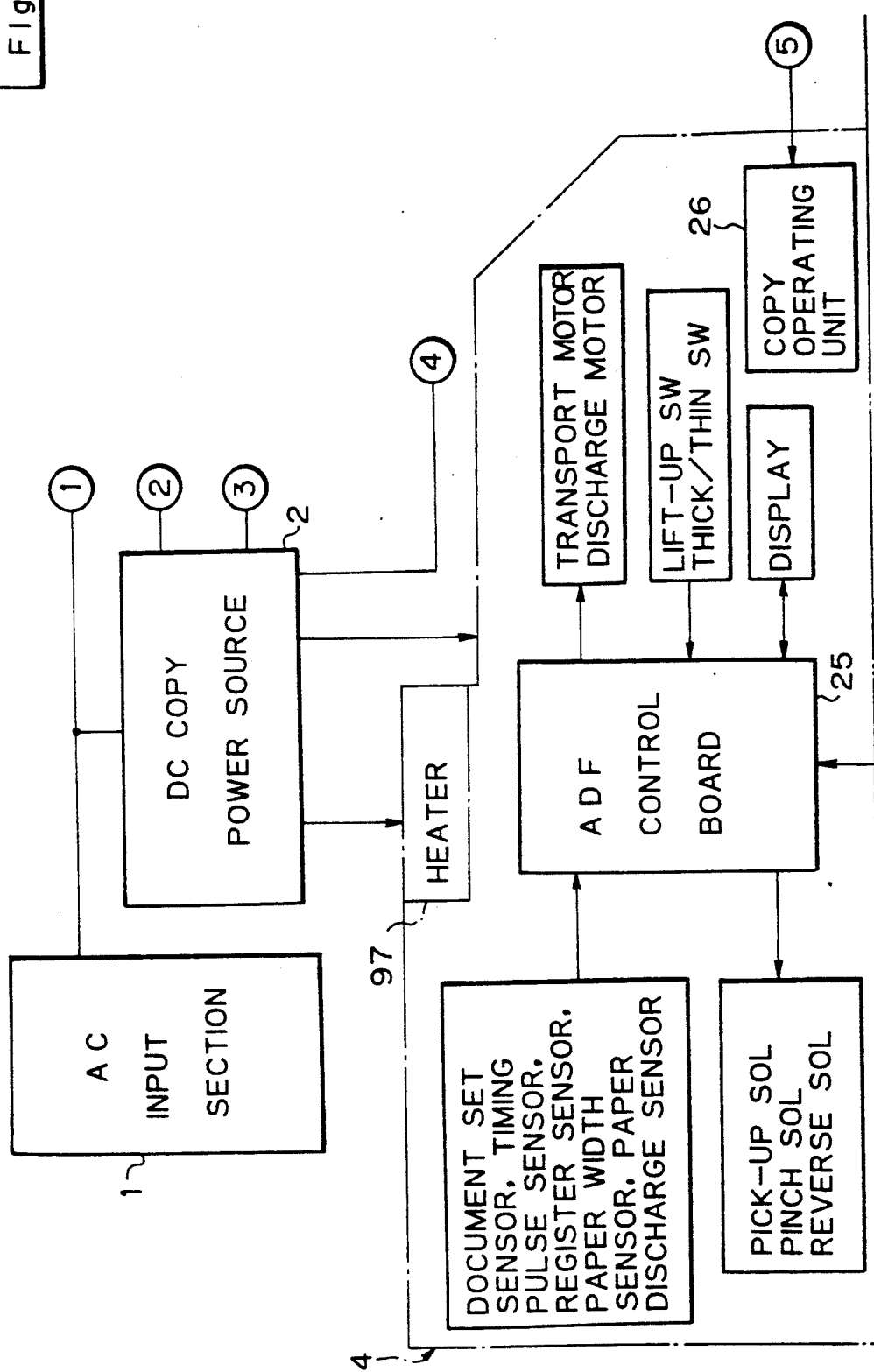

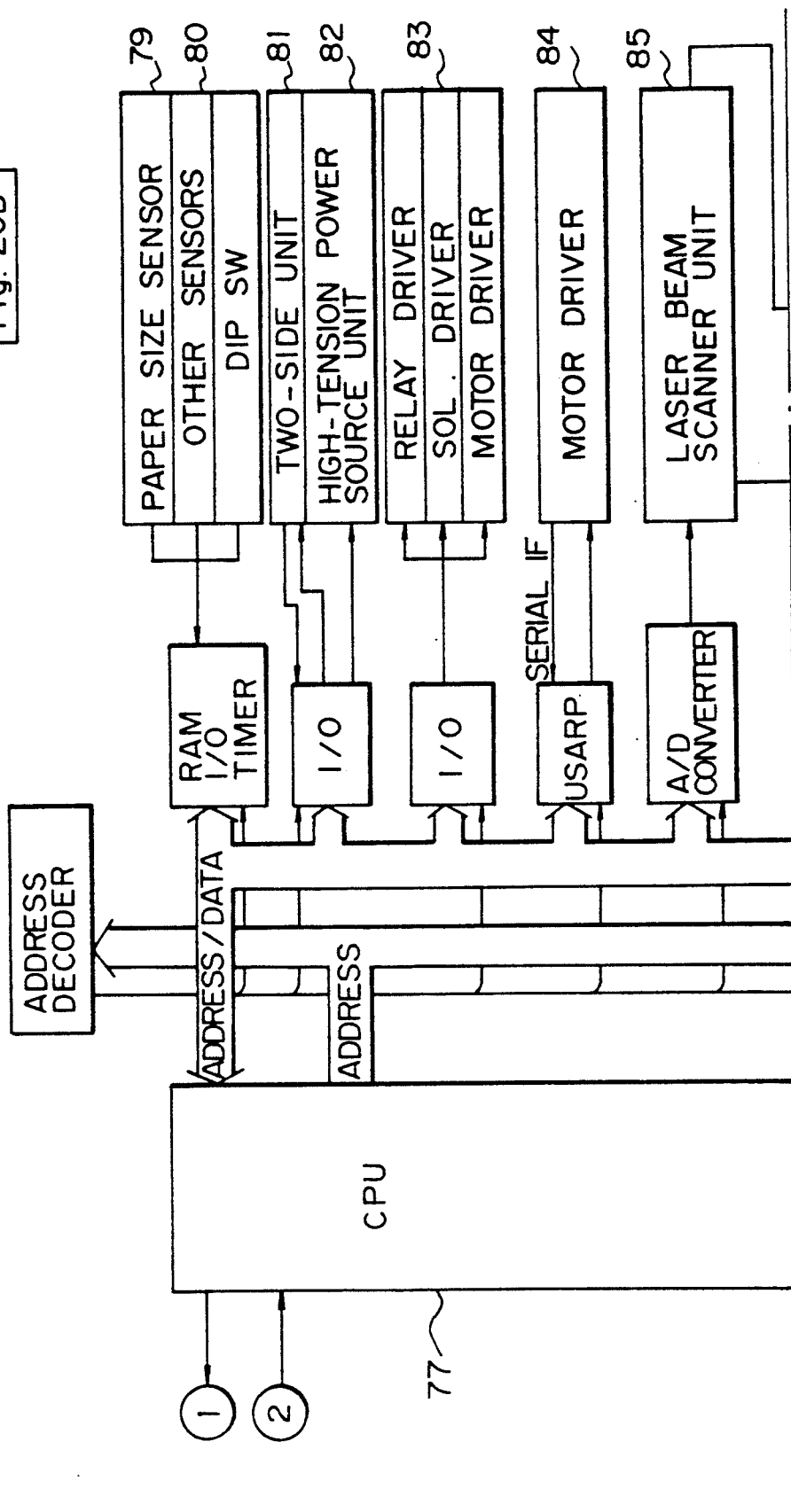

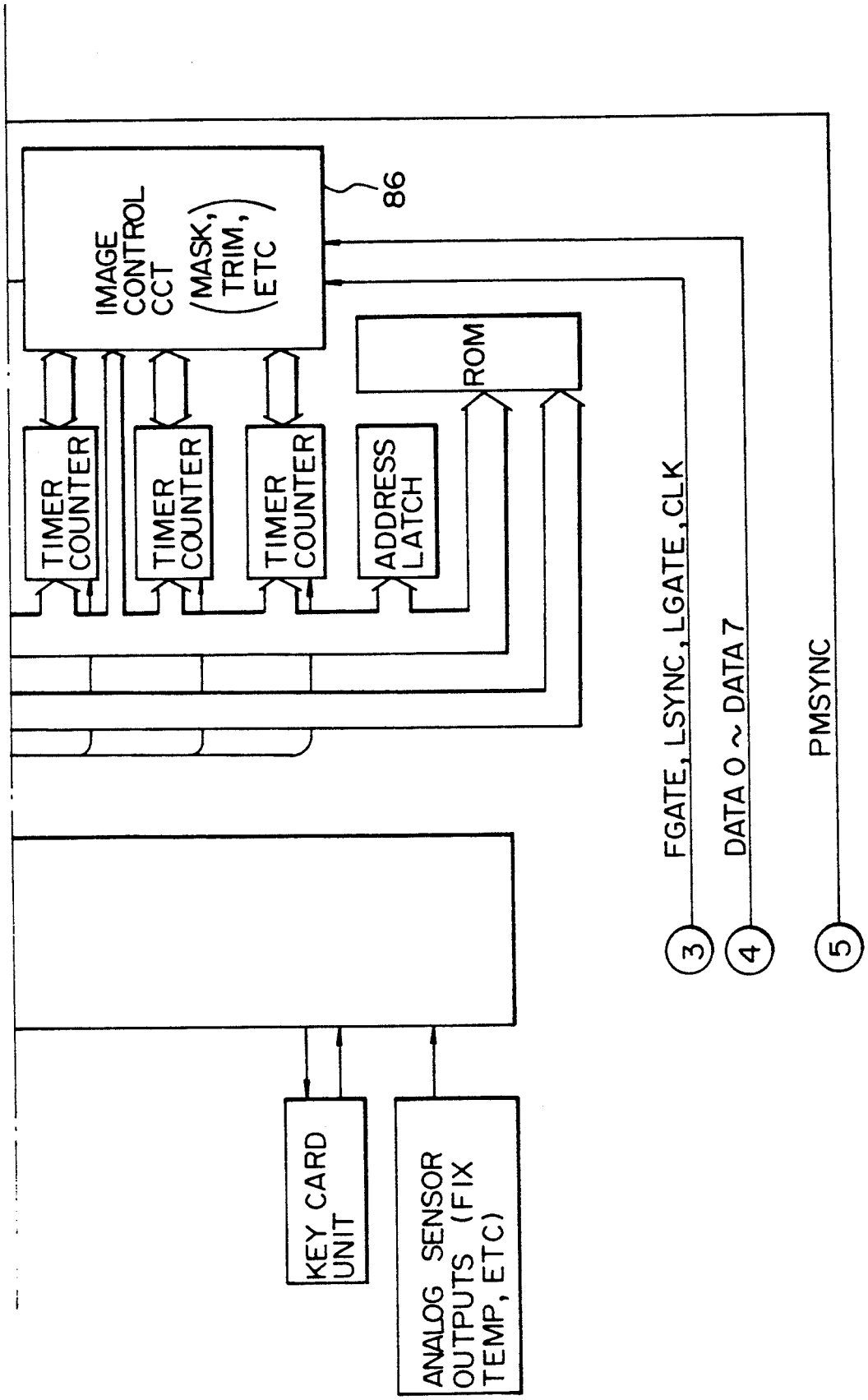

MULTIPLEX IMAGE FORMING APPARATUS

BACKGROUND OF THE INVENTION

The present invention relates to a facsimile transceiver, printer, copier or similar image forming apparatus and, more particularly, to a multiplex image forming apparatus which is the combination of such apparatuses.

An image forming apparatus of the type described generally includes means for preventing dew condensation from occurring thereinside. Such anti-dew condensation means is especially indispensible in environments which cause the room temperature to sharply change, e.g., in cold districts. The anti-dew condensation means is usually implemented as a heater incorporated in an AC power source line. It is a common practice to use, for example, a cord heater or a cement resistor as the anti-dew condensation means. Specifically, when a power switch is turned off, an opposite contact associated with the power switch is closed to energize the heater. The heater is arbitrarily located in the vicinity of a lens, mirror or similar part whose thermal conductivity is low or a metallic member having a substantial mass, e.g., the shaft of a photoconductive element or that of a roller. Since an AC power source in the form of a primary circuit is incorporated in the apparatus, such a heater makes it difficult to isolate the primary circuit from a secondary circuit for eliminating noise terminal voltage and radiation noise. Moreover, the conventional heater is susceptible to noise generated on the AC power source line and extraneous noise ascribable to, for example, a thunderbolt, resulting in complicated countermeasures.

A multiplex image forming apparatus having multiple functions, e.g., facsimile function, printer function and copier function is a recent achievement. A Japanese Patent Laid-Open Publication (Kokai) No. 57870/1989, for example, discloses a multiplex image forming apparatus which is the combination of a facsimile transceiver and a copier. In such an apparatus, even when a power source for the copier is turned off, it is automatically turned on when the facsimile transceiver receives data from a remote station. Then, the copier prints out the received data. This type of apparatus is provided with a main power source and a scanner power source. The main power source includes a detector responsive to the AC power source line. When the facsimile transceiver operates in a receive mode at night, a fixing heater and other constituents of the apparatus to be not used are deactivated to save power while preserving the facsimile function. However, since a control circuit incorporated in the apparatus is active at all times, a noticeable power saving effect cannot be expected. Further, with this conventional apparatus, it is impossible to reduce the power consumption by the DC power source during reception at night. In addition, in the receive mode operation at night, a cooling fan has to be rotated to cope with heat generation ascribable to power consumption, resulting in the increase in noise.

SUMMARY OF THE INVENTION

It is therefore an object of the present invention to eliminate the problems particular to a conventional multiplex image forming apparatus as discussed above.

It is another object of the present invention to provide a multiplex image forming apparatus which constantly remains in a standby state for multiple functions including a copier function, facsimile function and a printer function and, in a night receive mode, fully deactivates devices to be not used, thereby saving power and reducing noise.

In accordance with the present invention, a multiplex image forming apparatus comprises a power source for a copier, an application extending section allowing a facsimile function to be combined with the apparatus, and a power source for a multiplex configuration for driving the application extending section, a first and a second power source switch located at an input section preceding the two power sources, a detecting circuit connecting to the first power source switch for detecting turn-on and turn-off of the switch, and detection signal output control means for outputting a detection signal fed from the detecting circuit only when the second power source switch is turned on and the first power source switch is turned off.

Also, in accordance with the present invention, a multiplex image forming apparatus comprises a power source for a copier, an application extending section capable of combining a facsimile function with the apparatus, and a power source for a multiplex configuration for driving the application extending section, a first and a second switch located at an input section preceding the two power sources, and anti-dew condensation means operable only when the second power source switch is turned on and the first power source switch is turned off.

Further, in accordance with the present invention, a multiplex image forming apparatus comprises a power source for a cipier, an application extending section capable of combining a facsimile function with the apparatus, and a power source for a multiplex configuration for driving the application extending section, a first and a second switch located at an input section preceding the two power sources, and power supply path interrupting means for interrupting part of power supply paths only when the second power switch is turned on and the first power source switch is turned off.

Moreover, in accordance with the present invention, a multiplex image forming apparatus comprises a power source for a copier, an application extending section capable of combining a facsimile function with the apparatus, and a power source for a multiplex configuration for driving the application extending section, a cooling fan included in the power source of a copier, a heat generating member whose heat generating state changes, temperature detecting means for detecting the temperature of the heat generating member, and fan rotation speed control means for changing the rotation speed of the cooling fan in matching relation to the temperature detected by the temperature detecting means.

BRIEF DESCRIPTION OF THE DRAWINGS

The above and other objects, features and advantages of the present invention will become more apparent from the following detailed description taken with the accompanying drawings in which:

FIG. 20 is a block diagram schematically showing another part of the main control circuit assigned to sequence control.

DESCRIPTION OF THE PREFERRED EMBODIMENTS

Figure 10:
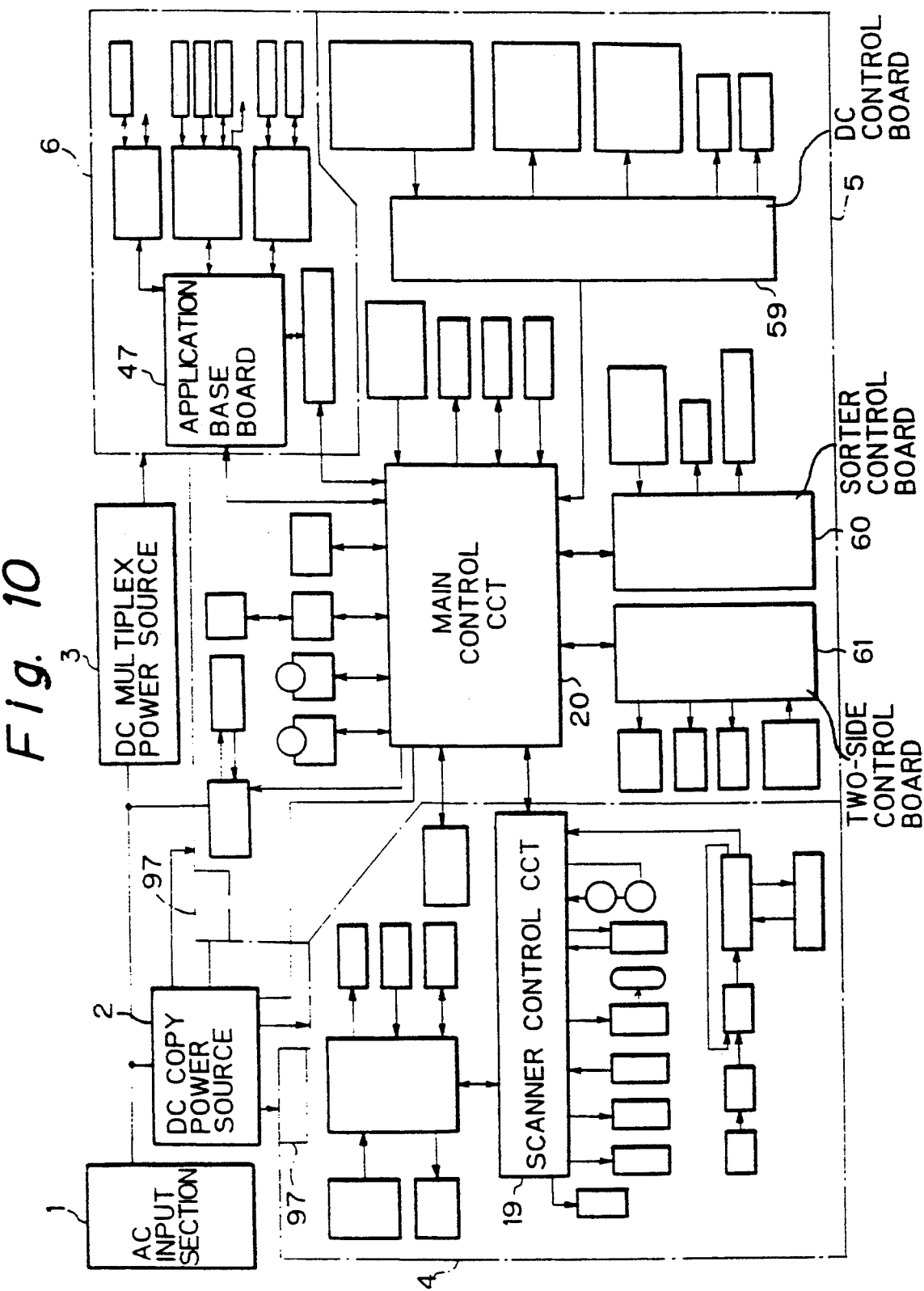
FIG. 10 is a block diagram schematically showing control circuitry included in a multiplex digital copier.
Figure 11B:
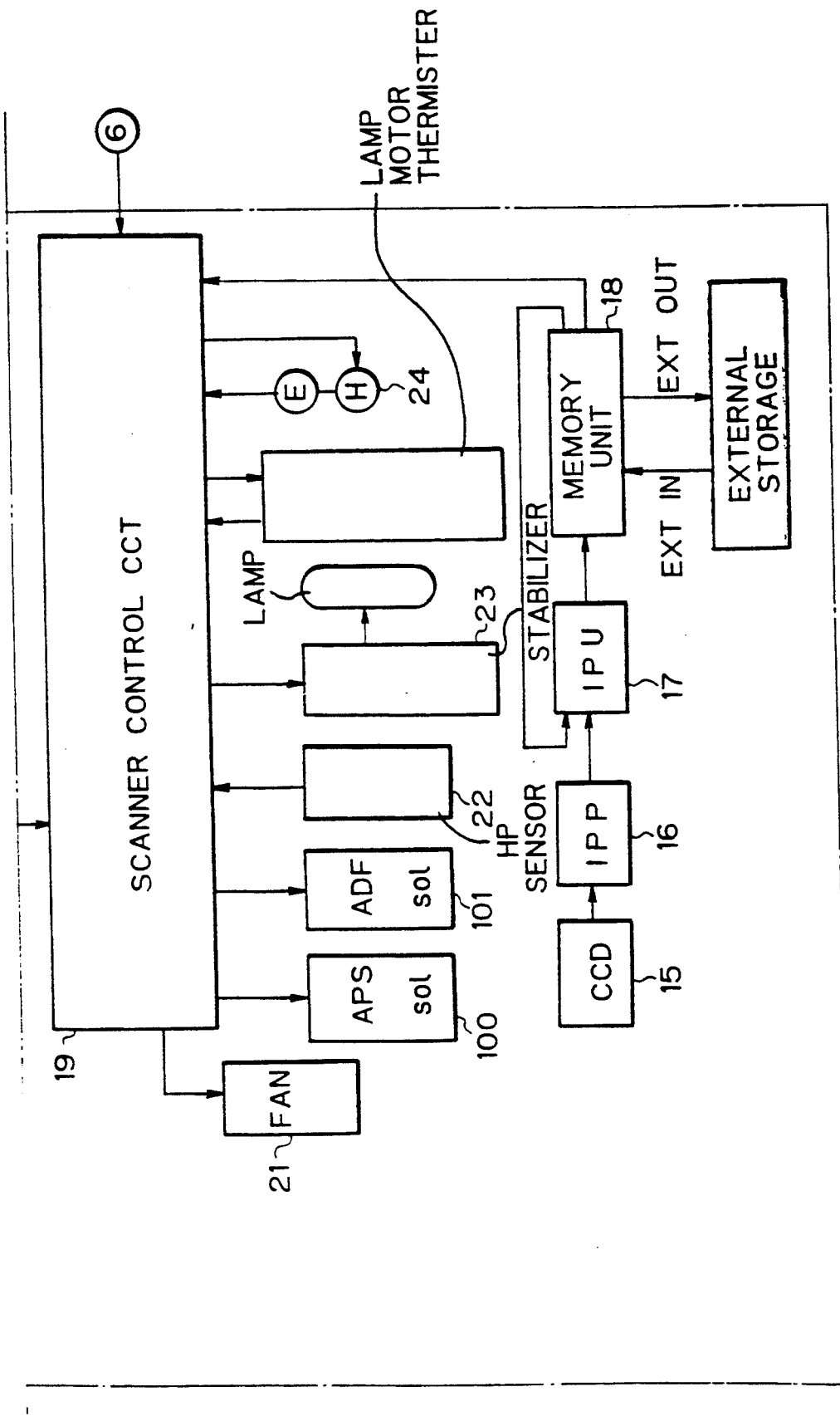
FIG. 11 is a block diagram schematically showing a scanner section included in the digital copier.
Figure 12A:
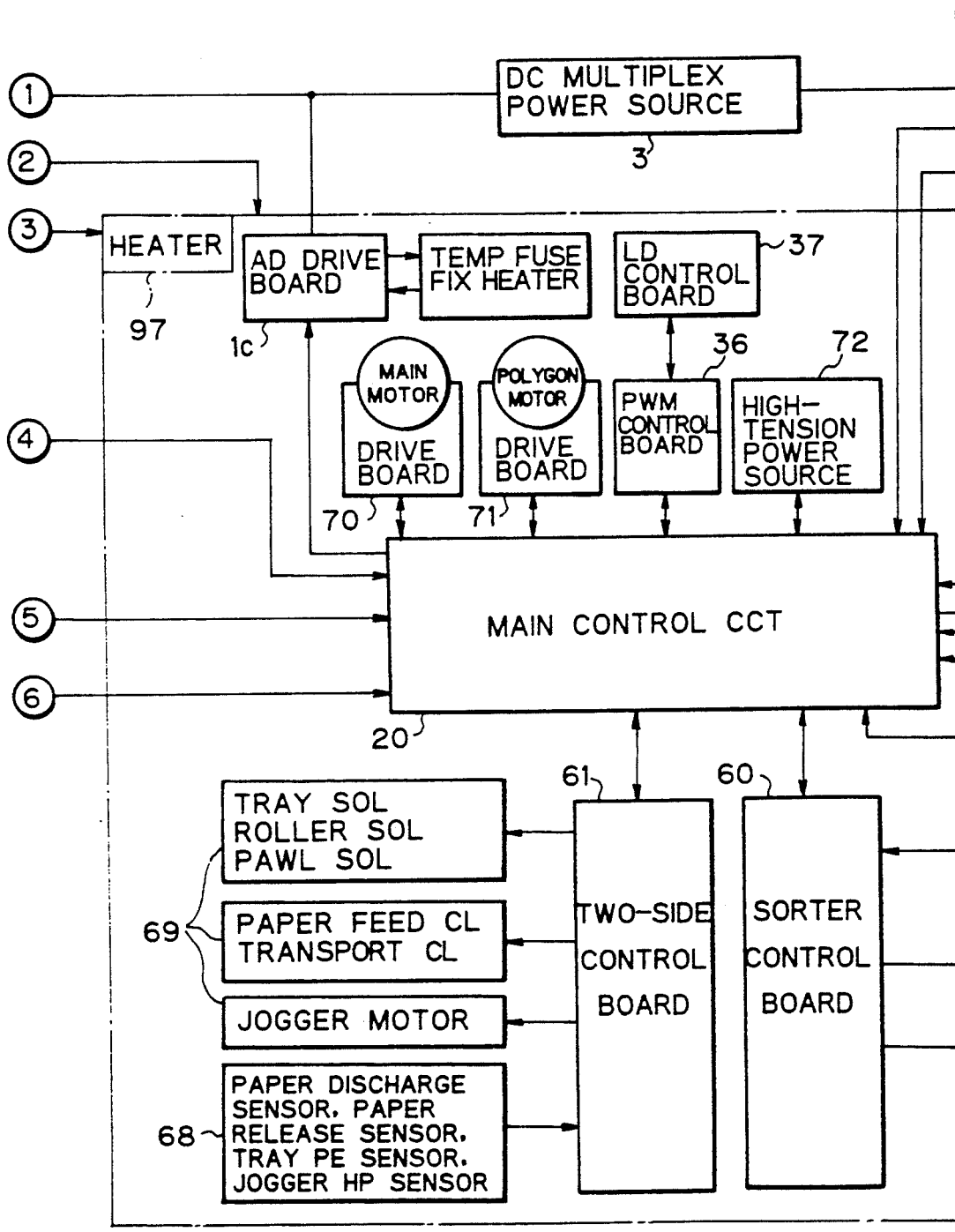
FIG. 12 is a block diagram schematically showing a specific construction of an electric part control section.
Figure 12B:
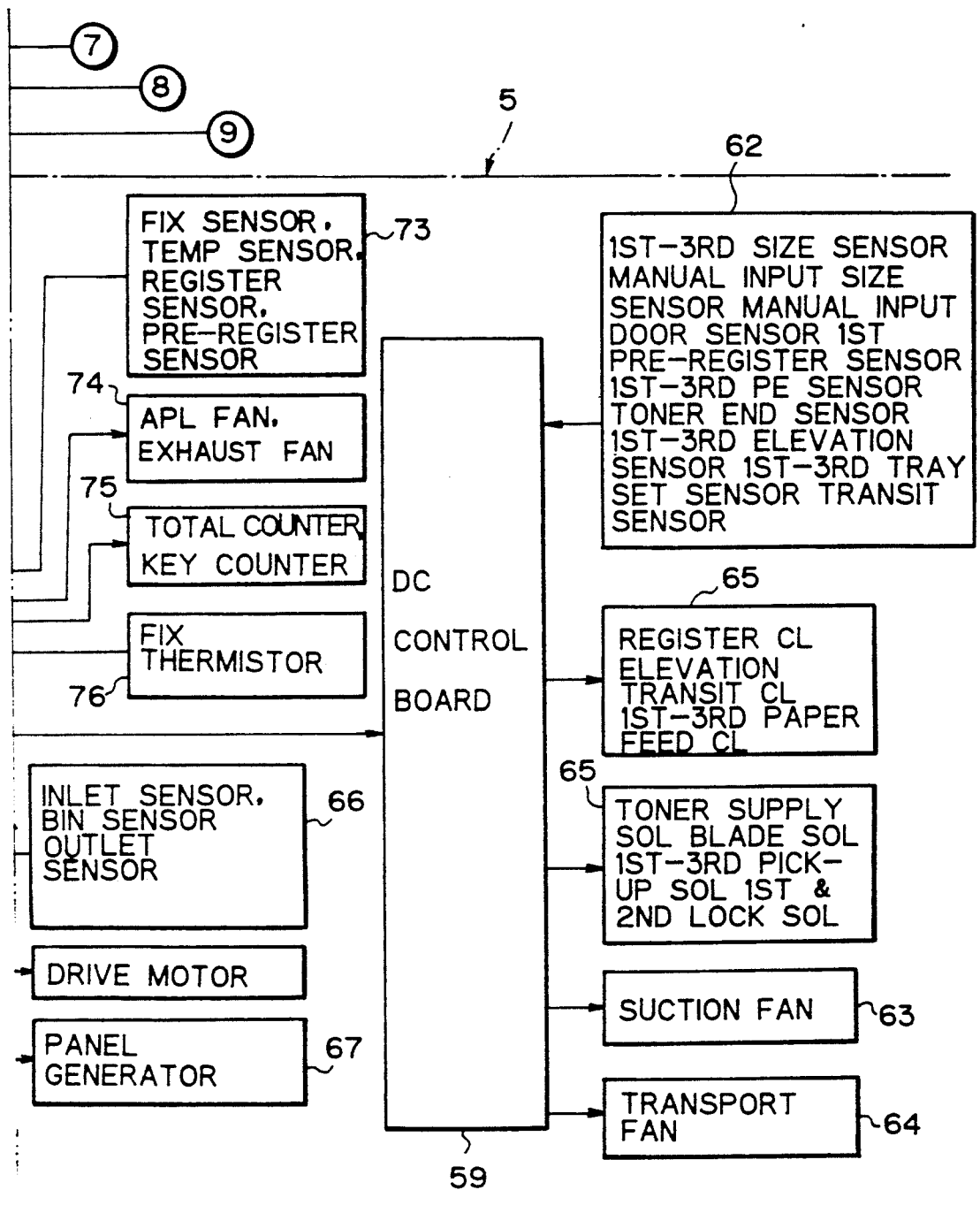
Figure 13:
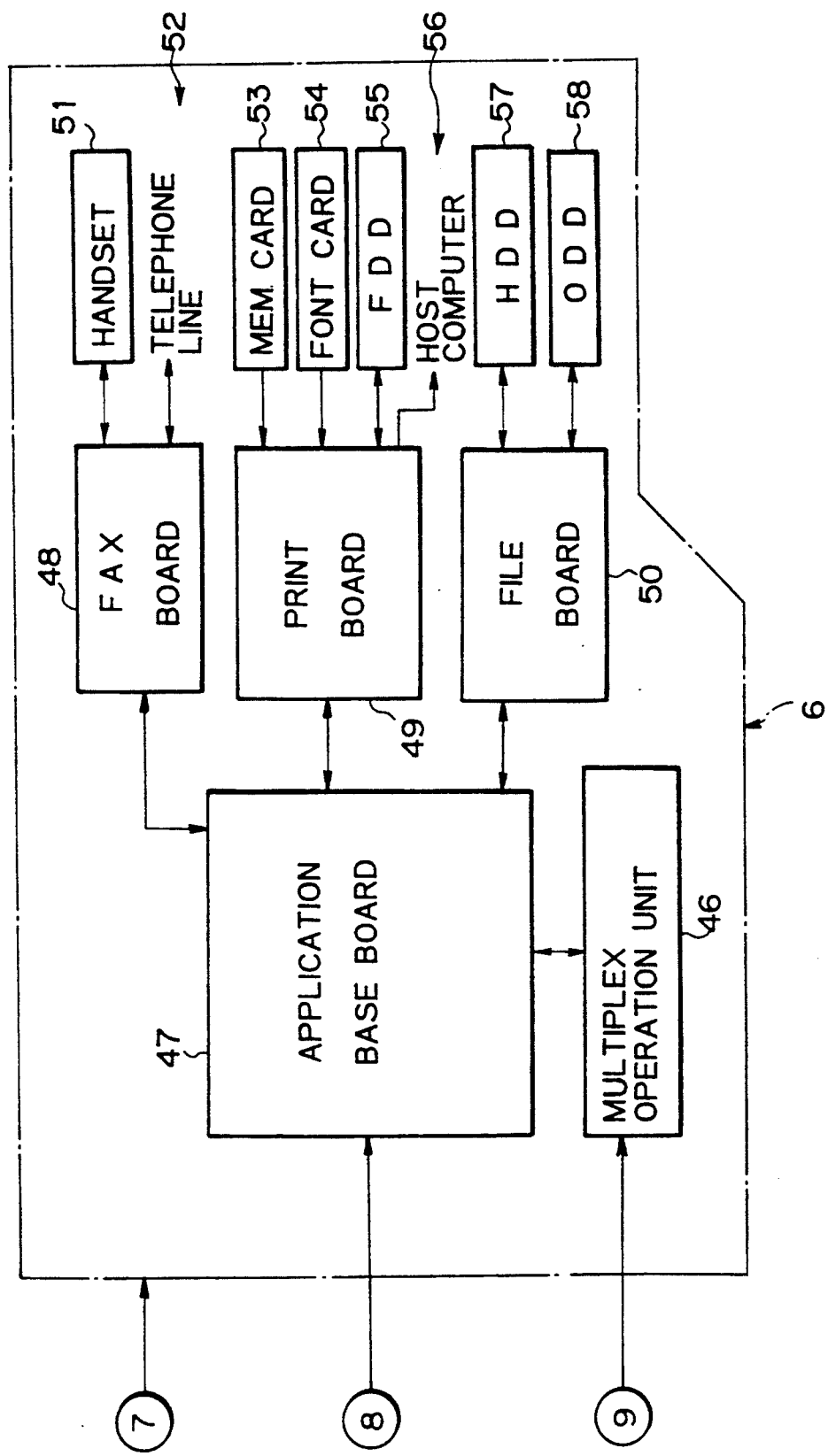
FIG. 13 is a block diagram schematically showing a specific construction of an application extending section.
Figure 14:
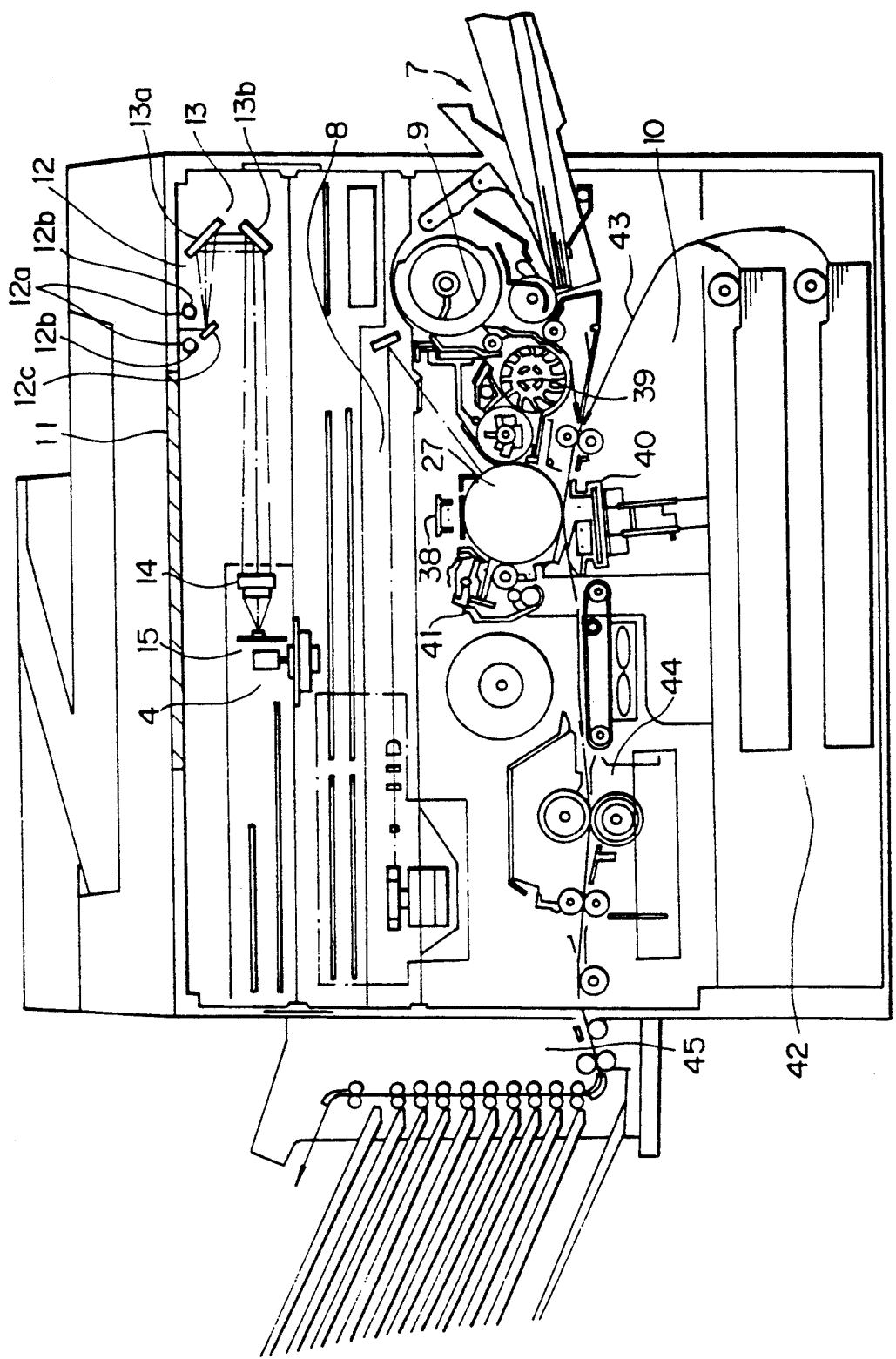
FIG. 14 is a vertical section showing the general construction of a multiplex digital copier.

Referring to FIGS. 1-7 and 10-20, a multiplex image forming apparatus embodying the present invention will be described. To better understand the essential part of the embodiment, the general construction of a multiplex image forming apparatus in the form of a digital copier will be described with reference to FIGS. 10-20. As shown in FIG. 10, the multiplex digital copier is generally made up of an AC input section 1, a DC copy power source 2 assigned to a copier function, a DC multiplex power source 3 assigned to a multiplex configuration, a scanner section 4, an electric part control section 5, an application extending section 6 for the multiplex function, and a printer section 7. As shown in FIG. 14, the printer section 7 has a writing section, an electrophotographic process section 9, and a paper processing section 10. FIGS. 11-13 show respectively specific constructions of the scanner section 4, electric part control section 5, and application extending section depicted in FIG. 10.

As shown in FIGS. 10-14, the scanner section 4 has a first scanner 12 movable at a particular speed matching a magnification, and a second scanner 13 movable at one half of the speed of the first scanner 12. The first scanner 12 has a light source 12a, a reflector 12b and a first mirror 12c in close proximity to the underside of a glass platen 11 which is positioned in an upper portion of the copier body. The second scanner 13 has a second mirror 13a and a third mirror 13b. The scanners 12 and 13 scan a document, not shown, laid on the glass platen 11 while illuminating it. The resulting reflection, or imagewise light, is routed through a lens 14 to a CCD (Charge Coupled Device) image sensor or primary solid-state image pick-up device 15 to be thereby photoelectrically transduced to an analog image signal. An image processor (IPP) 16 corrects the analog image signal with respect to the quantity of light, black level, and shading and then produces a corresponding digital image signal. The digital image signal is applied to an image processing unit (IPU) 17 to be subjected to various kinds of processing, e.g., high frequency enhancement or MTF (Modulation Transfer Function) correction, rate conversion or magnification change, gamma correction, and data depth conversion (8 bits/4 bits/1 bit). The processed digital image signal is fed to a scanner control circuit 19 either directly or by way of a memory unit (MEM) 18 and then applied to a main control circuit 20. The scanner control circuit 19 and main control circuit 20 are connected by a command interface and a parallel interface. The command interface is implemented by a full-duplex system using an optical fiber while the parallel interface is assigned to image signals and others which need high-speed processing.

The scanner control circuit 19 is located at the left-hand side of the scanner section 4, as viewed in FIG. 10, so as to totally control the scanner section 4. Specifically, as shown in FIG. 11, a cooling fan 21, a home position (HP) sensor 22, a stabilizer 23, a scanner motor 24 and an automatic document feeder (ADF) control board 25 are connected to the scanner control circuit 19. The scanner control circuit 19, therefore, effects various kinds of control including control of timings relating to the document handling and reading, i.e., the control of the rotation of a carriage drive motor, light to issue from a lamp, temperature of a lamp heater, and interface to the ADF, as well as the control of image data switching, magnification change, image editing, and tonality. Since the radiation noise ascribable to high-speed signals has substantial energy, the embodiment has various positive implementations against such noise, e.g., a gate array, shielded parallel interface, control circuitry with a shield cover, and reinforced connection of metallic elements. The scanner section 4 further includes an operation unit 26 for copying. While the operation unit 26 communicates with the main control circuit 20, use is made of an optical fiber for the communication in order to eliminate noise.

While the printer section 7 has the previously mentioned writing section 8, electrophotographic process section 9, and paper processing section 10, the following description will mainly concentrate on the writing section 8. Image data generated by the scanner section 4 (or the application extending section 6 which will be described) is steered by the main control circuit 20 to the writing section 8. In the writing section 8, a laser beam scans a photoconductive drum 27 by raster scanning to write the image data thereon.

Figure 15:
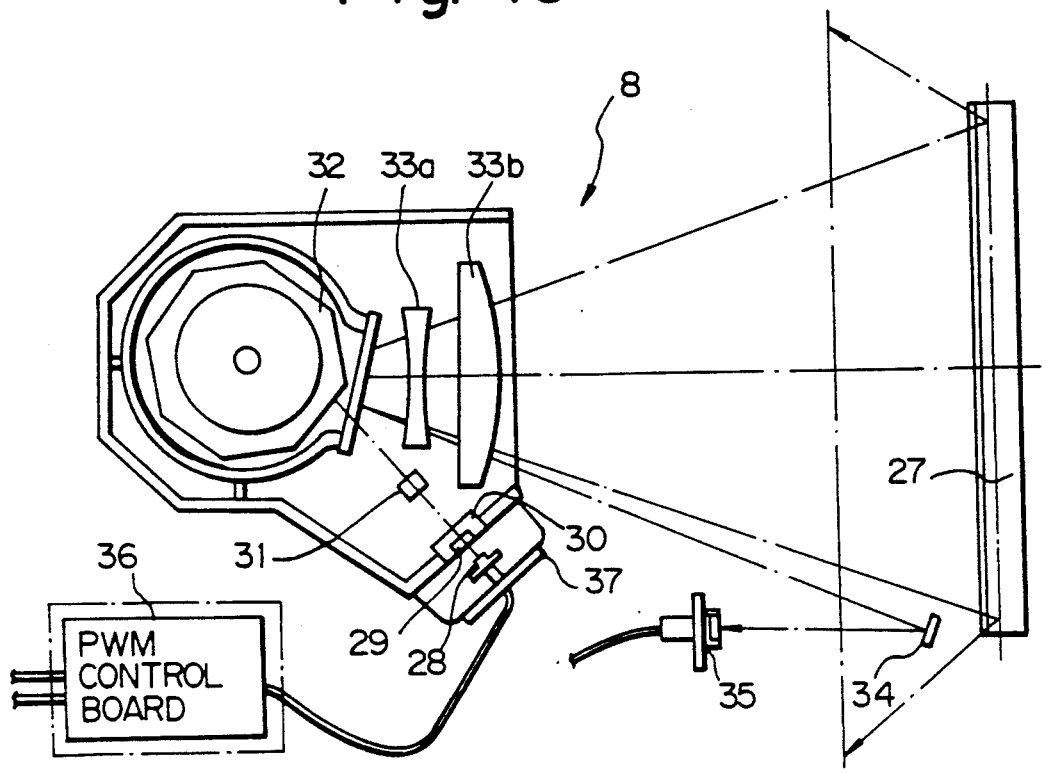
FIG. 15 is a plan view showing the construction of a writing section included in the digital copier of FIG. 14.
Figure 16:
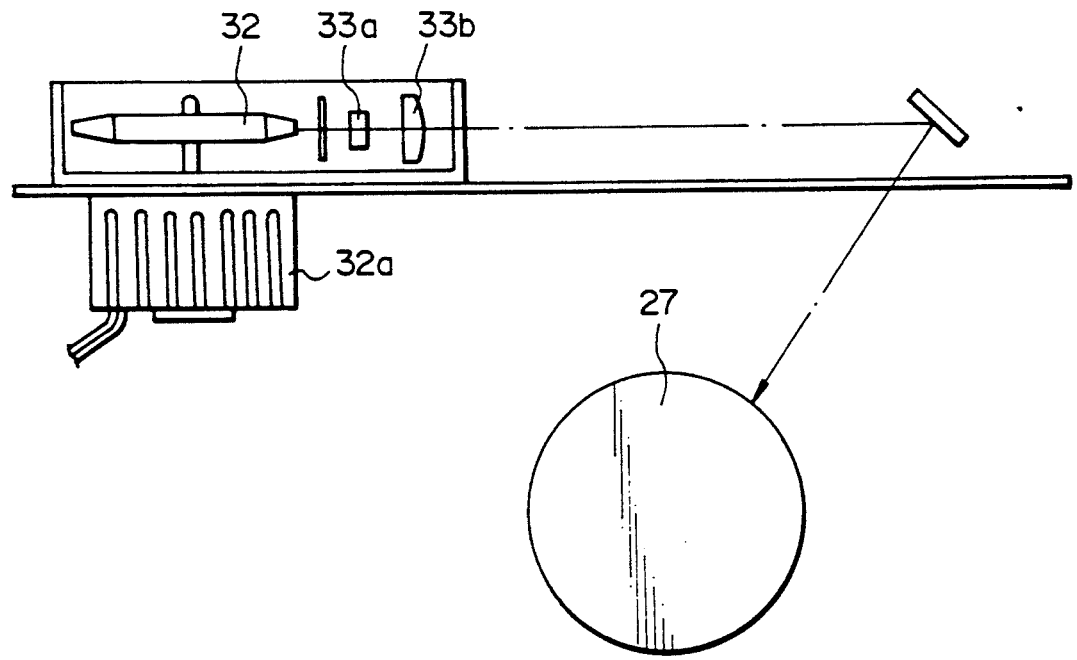
FIG. 16 is a side elevation of the writing section.
Figure 17:
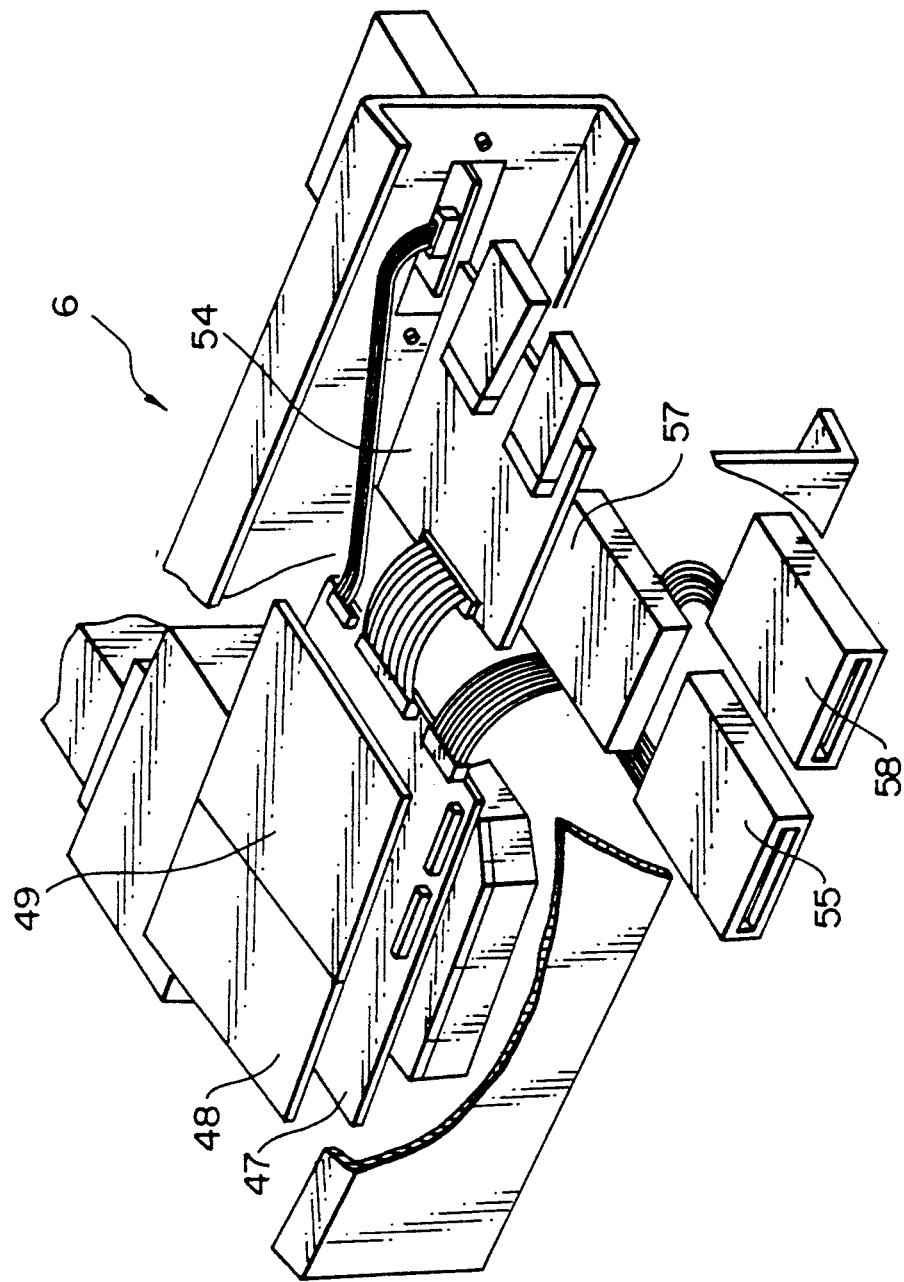
FIG. 17 is a perspective view of the application extending section.

Specifically, as shown in FIGS. 15 and 16, light issuing from a semiconductor laser 28 is converted to a parallel beam by a collimator lens 29 and then trimmed by an aperture 30 to have a predetermined shape. The trimmed laser beam is incident to a polygonal mirror 32 after being compressed by a first cylindrical lens 31 in the subscanning direction. The polygonal mirror 32 is rotated at a constant speed in a predetermined direction. The rotation speed of the polygonal mirror 32 is determined by the rotation speed and writing density of the drum 27 and the number of faces of the mirror 32. The laser beam incident to the polygonal mirror 32 is steered by the mirror 32 to sequentially reach f-theta lenses 33a and 33b. The laser beam coming out of the f-theta lenses 33a and 33b and having a constant angular velocity is focused onto the surface of the drum 27 with a minimum spot diameter and scans the surface of the drum 27. The f-theta lenses 33a and 33b also serve to correct errors ascribable to the irregularity in the positions of the faces of the polygonal mirror 32. At the same time, the laser beam passed the lenses 33a and 33b is guided to a synchronization detecting section 35 by a mirror 34. The resulting output of the detecting section 35 is propagated through an optical fiber, not shown, to a sensor portion included in the main control section 20. As a result, one line of image data is outputted on the elapse of a predetermined period of time after a synchronization (hereinafter abbreviated as sync) signal indicative of the beginning in the main scanning direction has been generated. Such a procedure is repeated to complete a single image.

To enhance enrich tonarity, the image data is applied to a PWM (Pulse Width Modulation) control board 36 also. In the PWM control board 36, when the input parallel image data are to be converted to serial image data for driving the laser or laser diode (LD) 28, a delay line and a programmable logic device (PLD) effect pulse width modulation with the parallel data and deliver the modulated data to an LD control board 37. As a result, an LD driver drives the laser 28 over a period of time matching a designated pulse width. A photodiode, not shown, is built in the laser 28 for the purpose of monitoring the laser beam. By monitoring the laser beam, it is possible to stabilize the quantity of the beam, to detect faulty laser drive, to increase or decrease the quantity of beam, and to correct the duration of laser drive. The PWM control board 36 suffers from radiation noise having substantial energy since elements having a rapid rising and falling capability are used to control pulse widths of nanosecond order. In light of this, the PWM control board 36 is confined in a shield case and is connected to the main control circuit 20 by a shield cable. A polygon motor 32a for driving the polygonal mirror 32 is rotated at a constant speed higher than 20,000 r.p.m so as to eliminate the irregularity in the writing pitch in the main scanning direction. A driver assigned to the polygon motor 32a is located at the left-hand side of the motor 32a to make the wiring therebetween as short as possible. A stream of air for cooling the motor 32a is not implemented by the atmosphere inside the machine in order to protect the polygonal mirror 32 from impurities including a silicon gas ascribable to image fixation and toner particles.

The above-described major electric circuitry relating to the writing section 8 is located at the left-hand side of the drum 27, as viewed in FIG. 14. The electrophotographic process section 9 and paper processing section 10 are disposed in the vicinity of the writing section 8. The process section 9 has a charger 38, a developing section 39, an image transfer section 40, and a cleaning section 41 which face the surface of the drum 27. The paper processing section 42 has a paper feeding section 42, a transporting section 43, a fixing section 44, and a discharging section 45.

The application extending section 6 will be described hereinafter. To begin with, why this section 6 is desirable will be described. Digital PPC is advantageous in that it processes an image by a digital electronic circuit and can be readily connected to another electronic equipment. On the other hand, office automation equipment including facsimile machines and word processors are extensively used today. There is an increasing demand for a systematic product having a copier at the center thereof, e.g., multiplex facsimile, word processor or electronic file equipment. The application extending 6 meets such a need and allows the user to achieve advanced multiplex functions by simple operations. The construction of the application extending section 6 will be described with reference to FIGS. 13 and 17.

The application extending section 6 has an operation unit 46 and an application base board 47 which are connected to the main control circuit 20. A facsimile (FAX) board 48, a print board 49 and a file board 50 are connected to the application base board 47. A handset 51 and a telephone line 52 are connected to the FAX board 48. A memory (MEM) card 53, a font card 54, FDD 55 and a host computer 56 are connected to the print board 49. An HDD 57 and an ODD 58 are connected to the file board 50. An LCDC board, LCD and touch panel, not shown, are connected to operation unit 46.

The operation unit 46 has a 256×400 dots liquid crystal display panel, transparent touch switches, a control circuit for controlling the switches, and a unit implementing back illumination. The operation unit 46 is connected to the main control circuit 20 by an optical fiber for implementing command interface. Regarding display data, the operation unit 46 is interfaced to the application base board 47 by parallel interface. Even when one or both of the print board 49 and FAX board 48 are added to the copier, the application base board 47 performs control relating to display and input operations in combination with the operation unit 46 by smoothly mediating between them and the main CPU of the main control circuit 20. The FAX board 48 serves a FAX function via the telephone line 52. Particularly, in the event of reception at night, received information is stored in the HDD 57 under the control of the application base board 47. The print board 49 has a function of an off-line printer, e.g., an SIO or CENTRO on-line printer, FDD 55, or MEM card 53. The file board 50 reads and writes data in a medium with which the HDD 57 or the ODD 58 is operable. Since the FDD 55 and ODD 58 are frequently operated by the user, they are positioned just below the operation unit 26, i.e., at a desirable level for manipulation and operated at the front. The font card 54 and MEM card 53 which will be operated less frequently than the FDD 55 and ODD 58 are operated at the side although they are located at substantially the same level as the latter.

When the above-stated boards for a multiplex configuration are simply arranged in unoccupied spaces, complicated wirings will increase, buses will become susceptible to noise, and radiation noise will increase. In the embodiment, such boards are disposed in the space available in the writing section 8 and a substantially hermetic space formed between the scanner section 4 and the writing section 8. Again, the boards communicate with the main control circuit 20 over an optical fiber and a shield cable to reduce the influence of noise.

As shown in FIG. 12, the main control section 20 included in the control section 5 is connected to the scanner section 4 and application extending section 6 as well as other sections for controlling the scanner and the facsimile and other multiplex equipment. In addition, the main control section 20 is connected to a DC control board 59, a sorter control board 60, and a two-side control board 61. Sensors 62 including a paper size sensor and a tray set sensor, a suction fan 63, a transport fan 64, and a drive control section 65 for effecting various copy modes are connected to the DC control board 59, whereby operations in various copy modes including ordinary one are controlled. Sensors 66 and a drive control section 67 for interrupting an operation under way are connected to the sorter control board 60, thereby controlling the operation of a sorter. Connected to the two-side control board 61 are sensors 68 responsive to the discharge and release of paper sheets and drive control sections 69 assigned to a two-sided copy mode. Motor drive boards 70 and 71, a high tension power source 72, sensors 73, fans 74 including an exhaust fan, counters 75 including a key counter, and a thermistor 76 associated with fixation are connected to the main control circuit 20, whereby the scanner operations and printing operations are totally controlled.

Figure 18:
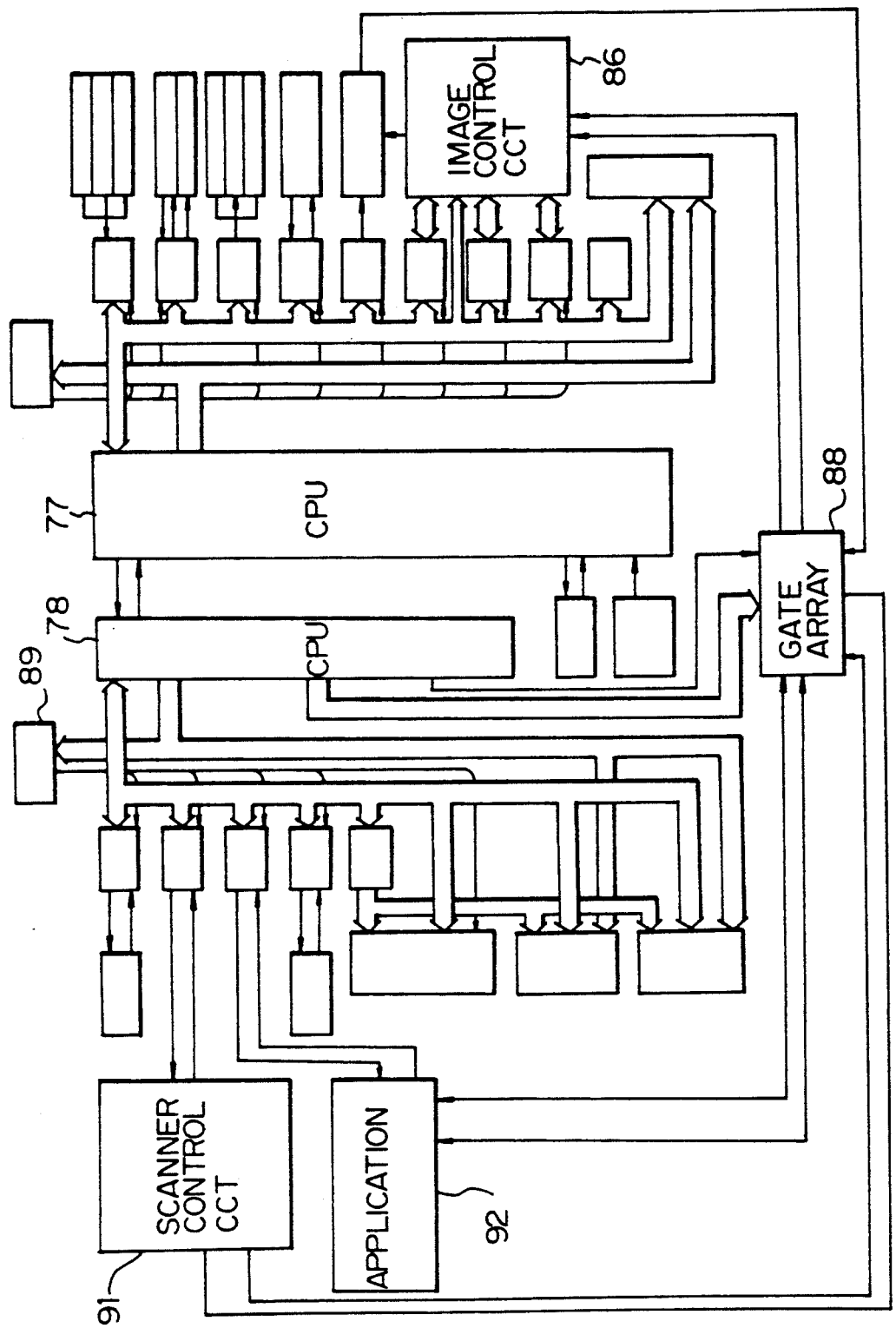
FIG. 18 is a block diagram schematically showing a specific construction of a main control circuit included in an electric part control section.

The construction of the man control circuit 20 will be described with reference to FIGS. 18–20. As shown, the main control circuit 20 has two CPUs 77 and 78 as copier control units; the CPUs 77 and 78 are assigned to sequence control and operation control, respectively. The CPUs 77 and 78 are connected together by a serial interface.

To begin with, sequence control to be executed by the CPU 77 will be described. The sequence sets and outputs various conditions relating to the paper transport timings and the formation of an image. Connected to the CPU 77 are a paper size sensor 79, sensors 80 responsive to the discharge and register of a paper sheet, a two-sided copy unit 81, a high tension power source unit 82, drivers 83 for driving relays, solenoids, motors and fans, a sorter unit 84, a scanner unit 85 (including the laser unit), and an image control circuit 86. The paper size sensor 79 senses the size and orientation of paper sheets stacked on a paper cassette to generate corresponding electric signals. The sensors 80 include sensors relating to paper transport, sensors associated with supplies, e.g., an oil end sensor and a toner end sensor, and sensors responsive to the faults of the machine, e.g., a door open sensor and a fuse sensor. The two-sided copy unit 81 includes a motor for positioning paper sheets in width, a paper feed clutch, solenoids for steering a paper sheet, a paper presence/absence sensor, a side fence position sensor for positioning paper sheets in width, and sensors responsive to paper transport. The high tension power source unit 82 applies a predetermined high voltage to each of a main charger, transfer charger, separation charger and a bias electrode for development by a particular duty resulted from PWM control. The drivers 83 drive the paper feed clutch, register clutch, counters, motors, fans, toner supply solenoid, power relays, fixing heater, etc.

The sorter unit 84 is connected to the CPU 77 by an optical serial interface and, in response to signals from the sequence, transports paper sheets at predetermined timings to consecutive bins thereof. The sorter unit 84 receives analog signals which are a signal representative of a fixing temperature, the output of the photosensor, an LD monitor output, and an LD reference voltage. In response to the output of the thermistor located at the fixing station, the sorter unit 84 ON/OFF controls or controls the phase of the heater. Regarding the photosensor output, a photosensor pattern formed at a predetermined timing is inputted via a phototransistor to determine the density of the pattern. The determined density is used to ON/OFF control the toner supply clutch for controlling toner density and to detect a toner end condition. The scanner unit 85 uses an analog-to-digial (A/D) converter and the analog output of the CPU 77 as a mechanism for maintaining the LD output power constant. Specifically, the scanner unit 85 controls the LD power such that the voltage monitored on the turn-on of the LD coincides with a predetermined reference voltage (which is selected to set up an LD output of 3 mW).

Figure 19:
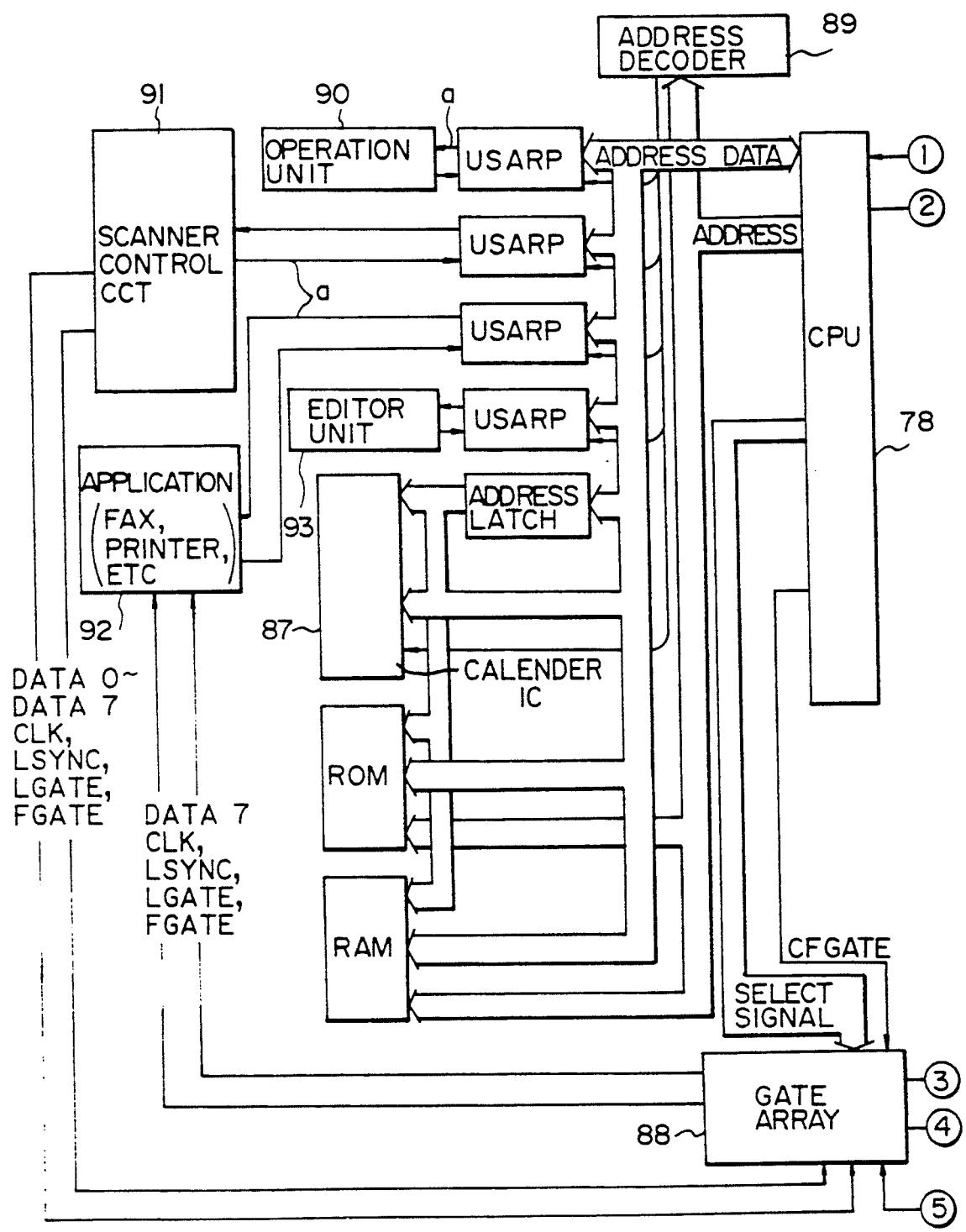
FIG. 19 is a block diagram schematically showing part of the main control circuit assigned to operation control.

FIG. 19 shows the operation control to be executed by the CPU 78. As shown, a plurality of serial ports a, a calendar IC 87, a gate array 88 and an address decoder 89 are connected to the CPU 78. Connected to the serial ports a are an operation unit 90, a scanner control circuit 91, an application 92, and an editor unit 93. The operation unit 90 has a display for displaying operator's key inputs and the states of the copier and informs the CPU 78 of key inputs by serial transmission. In response, the CPU 78 determines whether or not to turn on the display of the operation unit 90 and informs operation unit 90 of the result of decision by serial transmission. Then, a CPU built in the operation unit 90 turns on or turns off the display. The scanner control circuit 91 sends to the CPU 78 information relating to the control of a scanner servo motor, image processing and image reading. In response, the CPU 78 executes serial transmission processing and interface processing between itself and the ADF. The application 92 interfaces the CPU 78 to external equipment, e.g., facsimile transceiver or printer by interchanging predetermined information. The editor unit 93 serially sends masking data trimming data, image shifting data or similar image editing data entered by the operator to the CPU 78. The calendar IC 87 stores day and time and allows the CPU 78 to call then any time. Hence, only if the display of the current time on the display and the ON time and OFF time of the machine are set up beforehand, the machine can be controlled ON and OFF by a timer.

On receiving a select signal from the CPU 78, the gate array 88 delivers image data (DATA0–DATA7) and a sync signal to one of three different directions, as follows. A first direction is from the scanner control circuit 91 to the image control circuit 86, FIG. 20. In this case, the gate array 88 transfers 8-bit data (or 4-bit or 1-bit data) fed from the scanner control circuit 91 to the image control circuit 86 while synchronizing them to a sync signal PSYNC from the scanner unit 85. A second direction is from the scanner control circuit 91 to the applications 92. In this direction, the gate array 88 transfers an image signal in the form of 1-bit (binary) data from the scanner control circuit 91 to the application 92 in parallel. Then, the application 92 feeds the image data to a printer or similar output terminal connected to the copier. A third direction is from the application 92 to the image control circuit 86. In this case, the application 92 transfers an image data in the form of 1-bit (binary) data from a facsimile machine or similar input terminal to the image control circuit 86 while synchronizing them to the sync signal PMSYNC.

Hereinafter will be described specific constructions of essential part of the embodiment with reference to FIGS. 1-7.

Figure 1:
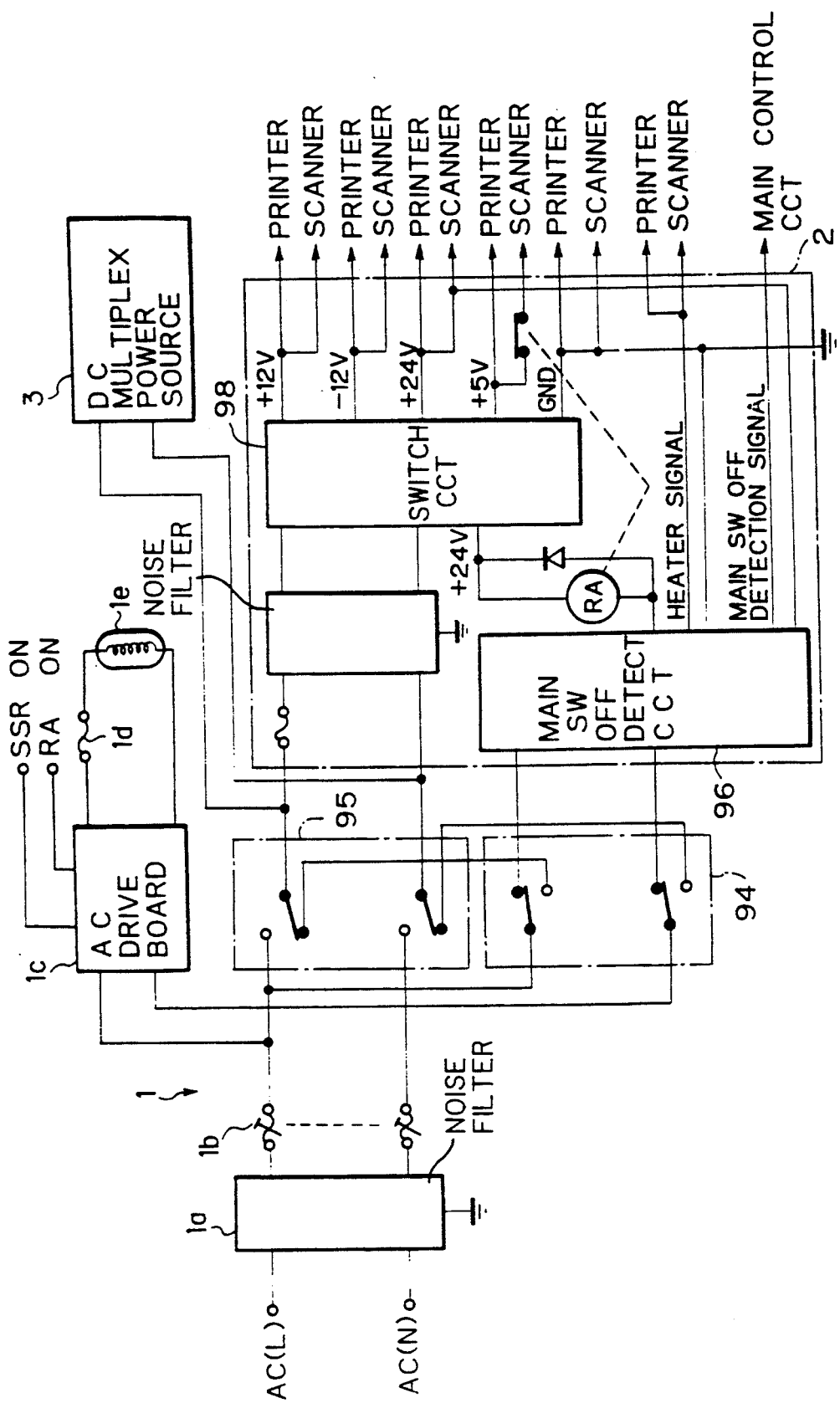
FIG. 1 is a block diagram schematically showing a power source circuit included in a multiplex image forming apparatus embodying the present invention.

As shown in FIG. 1, a first power source switch 94 and a second power source switch 95 are interposed between the DC copy power source 2 and DC multiplex power source 3 and the AC input section 1 preceding the power sources 2 and 3. The AC input section 1 consists of a noise filter 1a, a circuit breaker 1b, an AC drive board 1c, a temperature fuse 1d, and a fixing heater 1e. A main switch OFF or SWOFF detecting circuit 96 is connected to the first power source switch 94 to sense the ON and OFF states of the switch 94. Detection signal output control means, not shown, is contained in the main SWOFF detection circuit 96. This control means allows a detection signal or main SWOFF detection signal to be fed to the main control circuit 20 only when the second power source switch 95 is ON and the first power source switch 94 is OFF.

The scanner section 4 and printer section 7 are provided with a heater 97, FIG. 11, for eliminating dew condensation. The main SWOFF detecting circuit 96 sends a heater signal to the heater 97 such that the heater 97 operates only when the second power source switch 95 is ON and the first power source switch 94 is OFF. A switching circuit 98 plays the role of power supply path interrupting means for interrupting part of the power supply paths only when the second power source switch 95 is ON and the first power source switch 94 is OFF. The switching circuit 98 interrupts the power supply paths in a document handling section, document reading section, and user-oriented operating section, not shown, while turning off a DC power source cooling device, not shown.

Further, the copier of the embodiment has means for stopping the execution of user's manipulation, second power supply path interrupting means, and control means for interrupting a receive mode at night. The user's manipulation execution interrupting means stops the execution of control relating to the user's operations, except for on-line control, when the main SWOFF detection signal is generated. The second power supply path interrupting means interrupts, when the switching circuit 98 interrupts part of the power supply paths, other power supply paths. The receive mode interruption control means inhibits at least the fixing heater and rotary members from operating in response to the output signal of the previously mentioned detection signal output control means, except for print-out at night.

Figure 2:
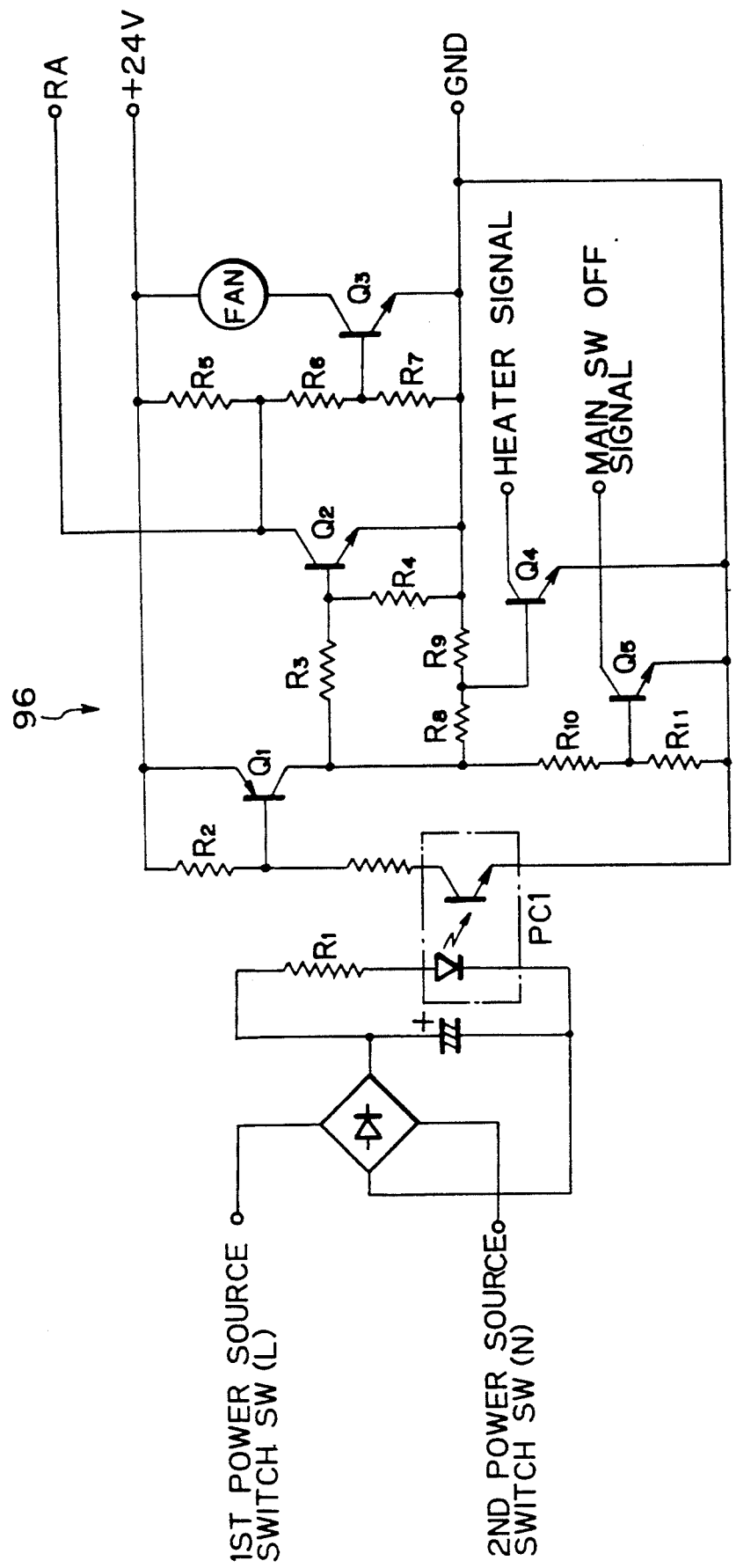
FIG. 2 is a diagram showing a specific construction of a main switch OFF detecting circuit included in the embodiment.

FIG. 1 shows the power source circuit having the AC power source 1, DC copy power source 2, and DC multiplex power source 3. FIG. 2 depicts a specific construction of the main SWOFF detecting circuit 96 included in the DC copy power source 2. The various means of the embodiment described above will be sequentially described specifically.

A commercially available power source (AC 100 V, 50/60 Hz) is fed to the noise filter 1a via a power source cord. This is to prevent the machine from malfunctioning due to extraneous noise superposed on the power source line and to prevent other equipment from malfunctioning due to intrinsic noise introduced in the power source line. The circuit breaker 1b follows the noise filter 1a for protecting the copier from overloads and other faults. The first power source switch 94, second power source switch 95 and AC drive board 1c are connected in parallel to the output of the circuit breaker 1b. The first power source switch 94 is operated daily by the user while the second power source switch 95 is not done so. The AC drive board 1c turns on a triac included in an SSR by a signal SSRON to control the heater, thereby maintaining the heat roller temperature at a fixing level. A signal RAON controls a relation which shuts off the power supply to the heater when the heater control falls in an unusual state. The AC drive board 1c does not operate unless the switching circuit 98 of the power source 2 operates.

The first and second power source switches 94 and 94 are operable in four different modes, as listed in Table 1 below.

TABLE 1

|  | MODE 1 | MODE 2 | MODE 3 | MODE 4 |
| --- | --- | --- | --- | --- |
| 1ST SWITCH | OFF | ON | OFF | ON |
| 2ND SWITCH | OFF | OFF | ON | ON |

Mode 1: Power is not fed to the switching circuit 98 of the DC copy power source 2, so that no DC output appears. In this condition, the fixing heater remains in an OFF state. Therefore, the main SWOFF detecting circuit 96 which operates at +24 V, as shown in FIG. 2, is not operated, maintaining the machine totally in an OFF state.

Mode 2: The switching circuit 98 is operated to output DC power, enabling heater control. At this instant, since the AC power source shown in FIG. 2 is not fed, PC1 and, therefore, $Q_1$ is OFF, so that $Q_2$, $Q_4$ and $Q_5$ are also OFF. In this condition, RA does not turn on with the result that Vcc (+5 V) is applied to the scanner section 4. Hence, the heater signal and main SWOFF detection signal are not outputted in an ON state. On the other hand, since $Q_2$ is OFF, $Q_3$ is turned on to turn on a self-cooled fan 99.

Mode 3: The switching circuit 98 is operated, enabling heater control. Since the main SWOFF detecting circuit 96 is an ON state due to the supply of AC, PC1 and $Q_1$ are ON to render $Q_2$, $Q_4$ and $Q_5$ ON. On the other hand, $Q_3$ is OFF. In this condition, RA is ON to prevent Vcc from reaching the scanner section 4, whereby the self-cooled fan 99 is not rotated. Instead, the heater signal is in an ON state to drive the heater 97, and the main SWOFF signal is also in an ON state and fed to the main control circuit 20. The mode 3 implements the previously mentioned dew condensation preventing mans.

Mode 4: This mode is identical with the mode 2 as to the operation and will not be described to avoid redundancy.

The modes 1, 2 and 4 are identical with modes which occur in an ordinary image forming apparatus. The mode 3 will be described more specifically hereinafter.

In the mode 3, since RA is ON, +5 V to the scanner section 4 is interrupted. Hence, the scanner control circuit 19, FIG. 11, does not rise, and drive signals meant for APSsol 100, ADFsol 101, (lamp) stabilizer 23, cooling fan 21 and scanner motor 24 are OFF. In this condition, power is substantially not consumed despite the supply of +24 V. As a result, the interruption of 5 V to the scanner section 4 reduces the total load acting on the DC copy power source 2 by about 60%. Since the entire scanner section 4 is held in an OFF state, dew is apt to condense in the image reading section including mirrors, lens and CCD array at night due to the fall of temperature. In light of this, the DC copy power source 2 is fed to the heater 97 to prevent dew condensation by heat. Since the heater 97 is implemented as a DC heater, it is isolated from AC and, therefore, little susceptible to noise. This prevents the heater 97 from effecting the other circuitry and from generating noise terminal voltages. In addition, the heater 97 protects the photoconductive drum and developing unit of the printer section 7 from dew condensation which is likely to occur in ordinary printers.

Figure 3:
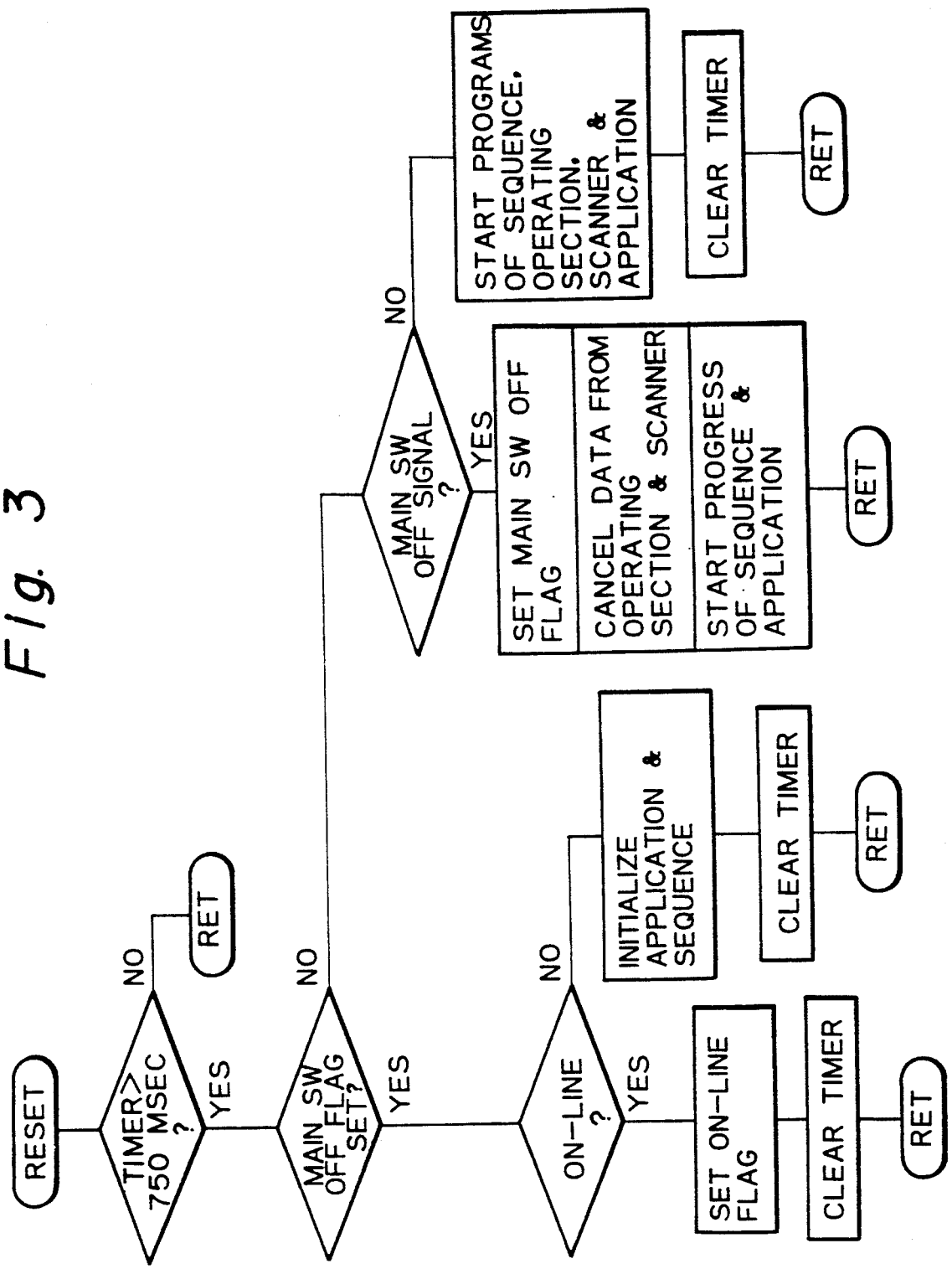
FIG. 3 is a flowchart demonstrating a specific operation of a main control circuit also included in the embodiment and which pertains to a mode 3.

In the mode 3, the main control circuit 20 is operated as follows. FIG. 3 demonstrates a specific operation of the main control circuit 20 in the mode 3 which is included in part of a main routine. As shown, when the switching circuit 98 of the DC copy power source 2 is operated, a main CPU built in the main control circuit 20 does not execute the program until a timer counts up a predetermined period of time long enough to fully initialize the various systems. Then, the CPU determines whether or not a main SWOFF flag is set, and, if it is not set, determines whether or not a main SWOFF signal is being generated by the DC copy power source 2. If the main SWOFF signal is absent, the CPU determines that an ordinary image forming mode has been set up, and it delivers program start signals to the various systems to thereby enable all the systems. If the main SWOFF signal is being generated, meaning that a night mode is set up, the CPU sets the main SWOFF flag. Then, the CPU cancels indetermined data from the operating section and scanner section 4 (including ADF) to which power is not fed, while causing the application to start up its program. Thereafter, the CPU repeats the sequence of steps described so far and determines whether or not an on-line mode is set by use of an on-line flag. If the on-line flag is not set, the CPU determines whether or not the copier is in an on-line state by referencing signals fed from the CPU of the application. If the answer of this decision is negative, meaning that the current state does not need operator's manipulation, the CPU initializes the application and sequence. If the current state is an on-line state, the CPU sets the on-line flag to allow the sequence and application programs to continue. On receiving an initialize signal from the CPU, the application and sequence each clears a RAM and all the ports thereof to set up a false power interruption state. Thereafter, the CPU clears the timer and does not repeat the routine thereafter. When the operator turns on the first power source switch 94 in the mode 3 so as to set up the mode 4, a procedure shown in FIG. 4 and also included in part of the main routine is executed.

Figure 4:
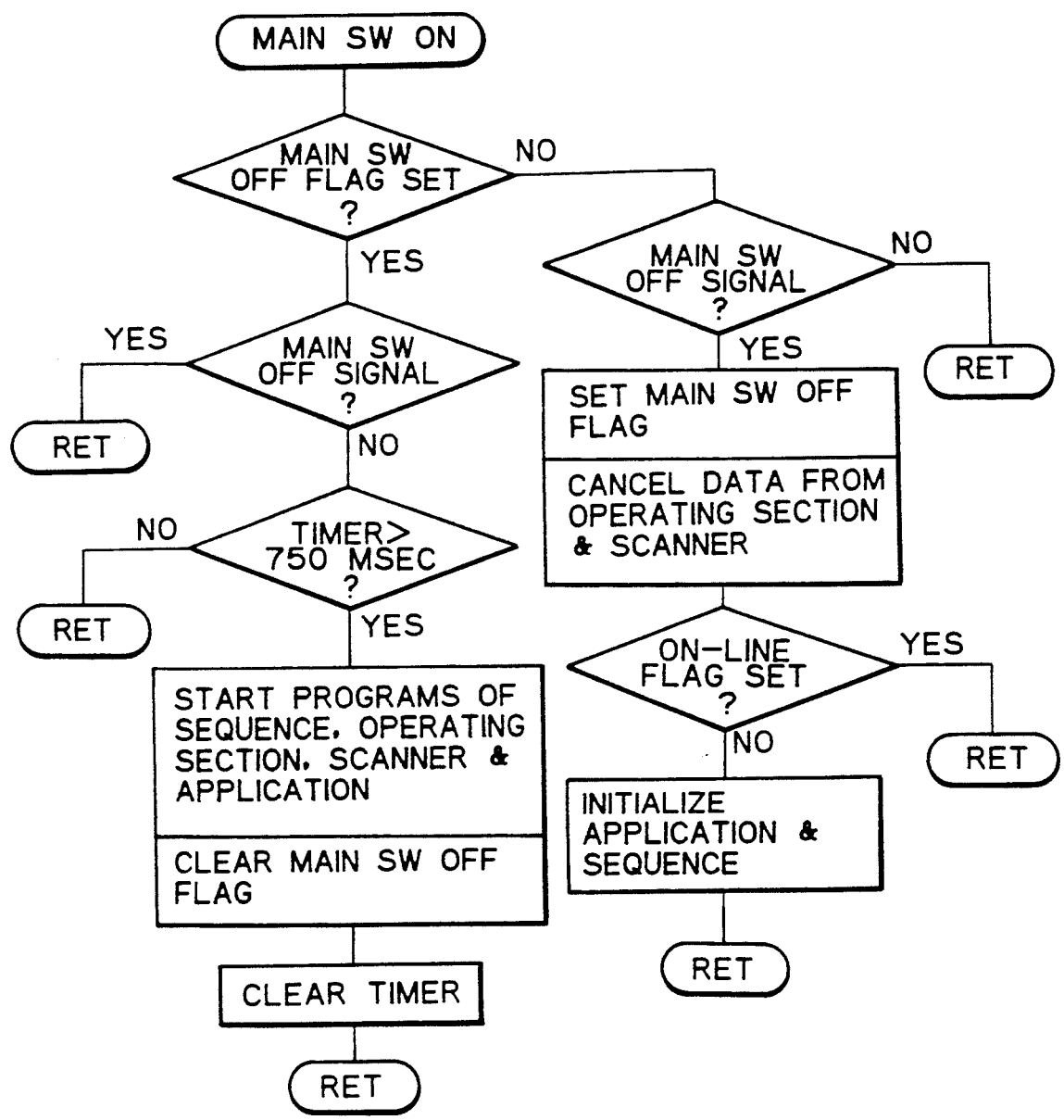
FIG. 4 is a flowchart demonstrating a specific operation pertaining to a mode 4.

In FIG. 4, since the main SWOFF flag has been set in the program of FIG. 3, the CPU determines whether or not the mode 3 has been cancelled by referencing the main SWOFF signal. If it has been cancelled, meaning that the operating section is being initialized with power being fed thereto, the CPU waits until a timer counts up a predetermined period of time and then enables the various systems. As the operator replaces the mode 3 with the mode 4, the CPU sets the main SWOFF flag since the main SWOFF flag is not set, i.e., the main SWOFF signal is generated. As a result, the indetermined data of the operating section and scanner section 4 to which power is not fed are cancelled. Subsequently, the CPU checks the on-line flag to see if the applications are on-line applications, thereby selecting respective night modes. In the night mode described above, when the sequence is initialized, the fixing heater, control, polygon motor, relay associated with the heater, cooling fan and so forth all are in an OFF state. When the applications are initialized, FDD 55, ODD 58 and HDD 57 all are disenabled.

Figure 5:
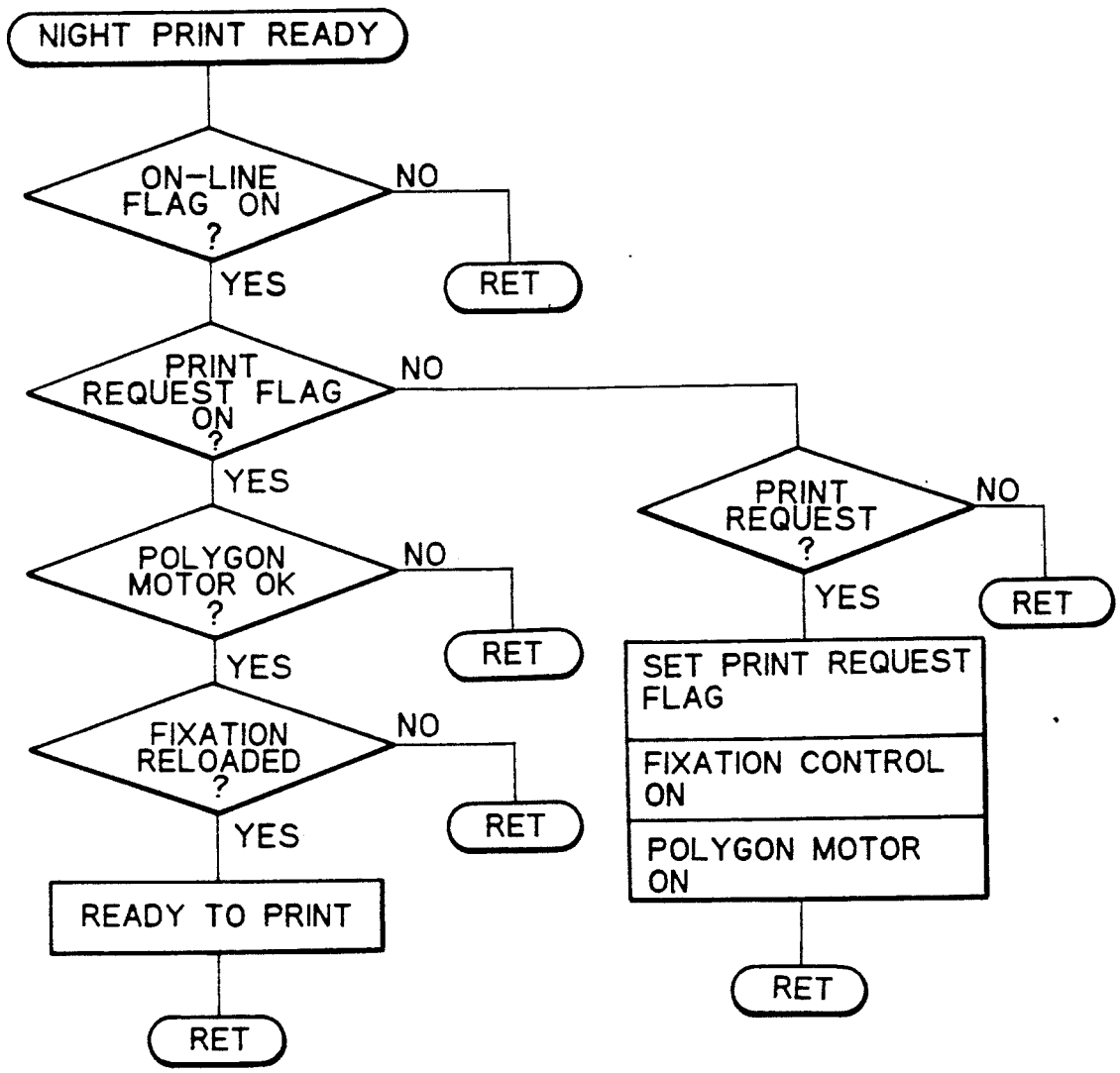
FIG. 5 is a flowchart showing a specific print ready sequence in a night on-line mode.
Figure 6:
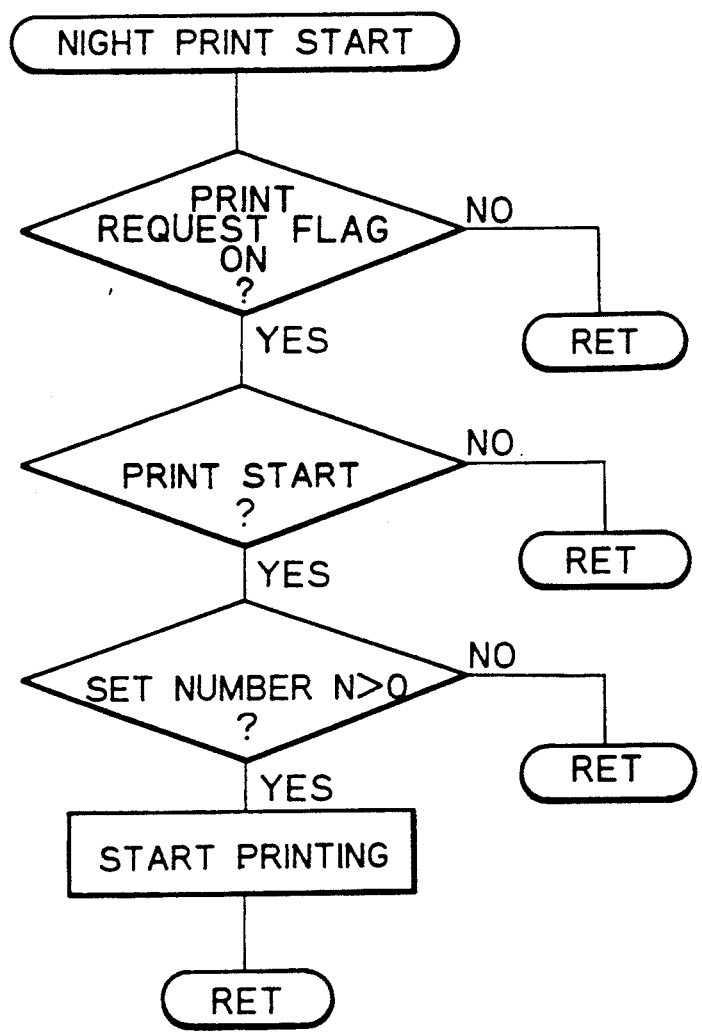
FIG. 6 is a flowchart representative of a print start sequence in the night on-line mode.
Figure 7:
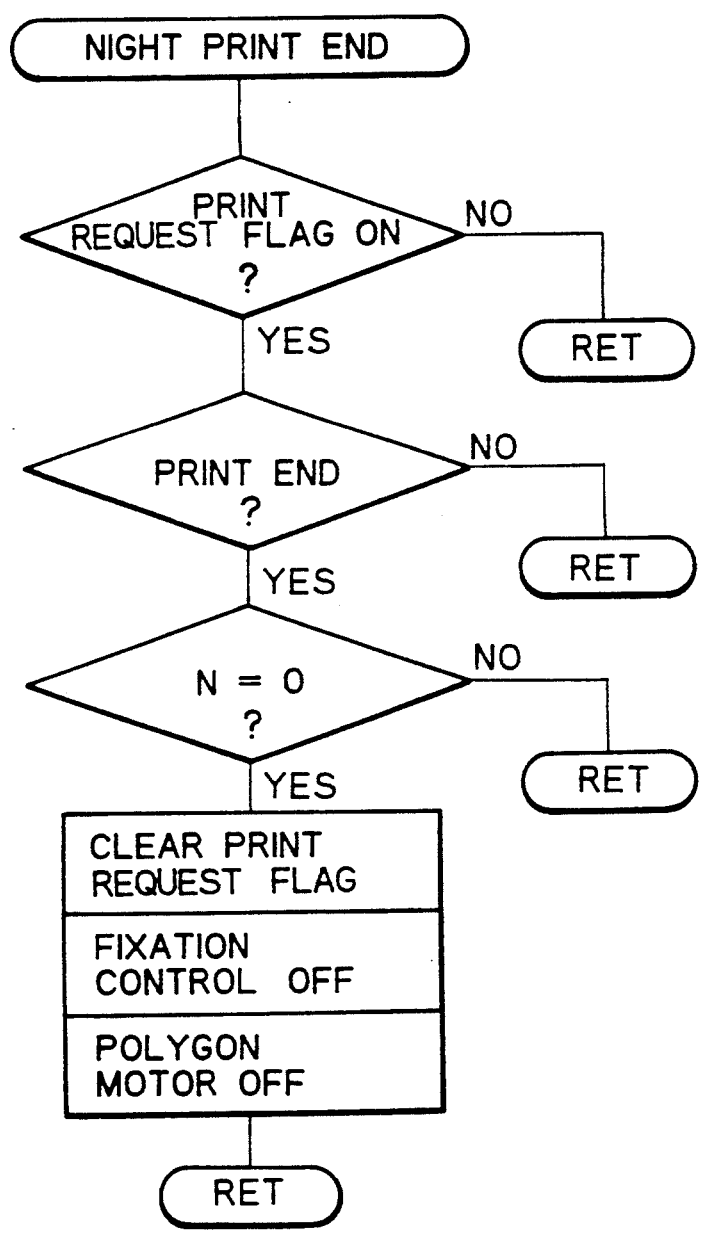
FIG. 7 is a flowchart representative of a print end sequence in the night on-line mode.

FIGS. 5-7 are representative of a specific print-out flow to be executed by the CPU when the memory is over in the night on-line mode. As shown in FIG. 5, on receiving a print request from the application, the CPU sets a print request flag, sends a fixation control ON command and a polygon motor ON command to the sequence, and then waits until the polygon motor and the fixation control reach a predetermined rotation speed and a predetermined fixing temperature, respectively. When the sequence informs the CPU of a print ready state, the CPU sends a print ready signal to the application. Subsequently, as shown in FIG. 6, as the CPU receives a print start signal from the application, it checks the set number of documents and then sends a print start signal to the sequence. In response, the sequence executes an image forming operation while the application sends image data to the writing section 8. As a result, the image data is written on the drum 27 by the laser. As shown in FIG. 7, as soon as the set number of documents have been printed out, the CPU clears the print request flag to thereby turn off the fixation control and polygon motor. Thereafter, the CPU restores the machine to the ordinary night on-line mode.

As described above with reference to FIGS. 3-7, the embodiment saves power in the night mode and, therefore, does not have to cool the DC copy power source 2 at night, i.e., natural cooling suffices. For this reason, in the mode 3, the self-cooling fan 99 associated with the power source 2 is turned off, as described with reference to FIG. 2. Hence, the embodiment realizes an extremely low noise and low power consumption operation at night.

Figure 8:
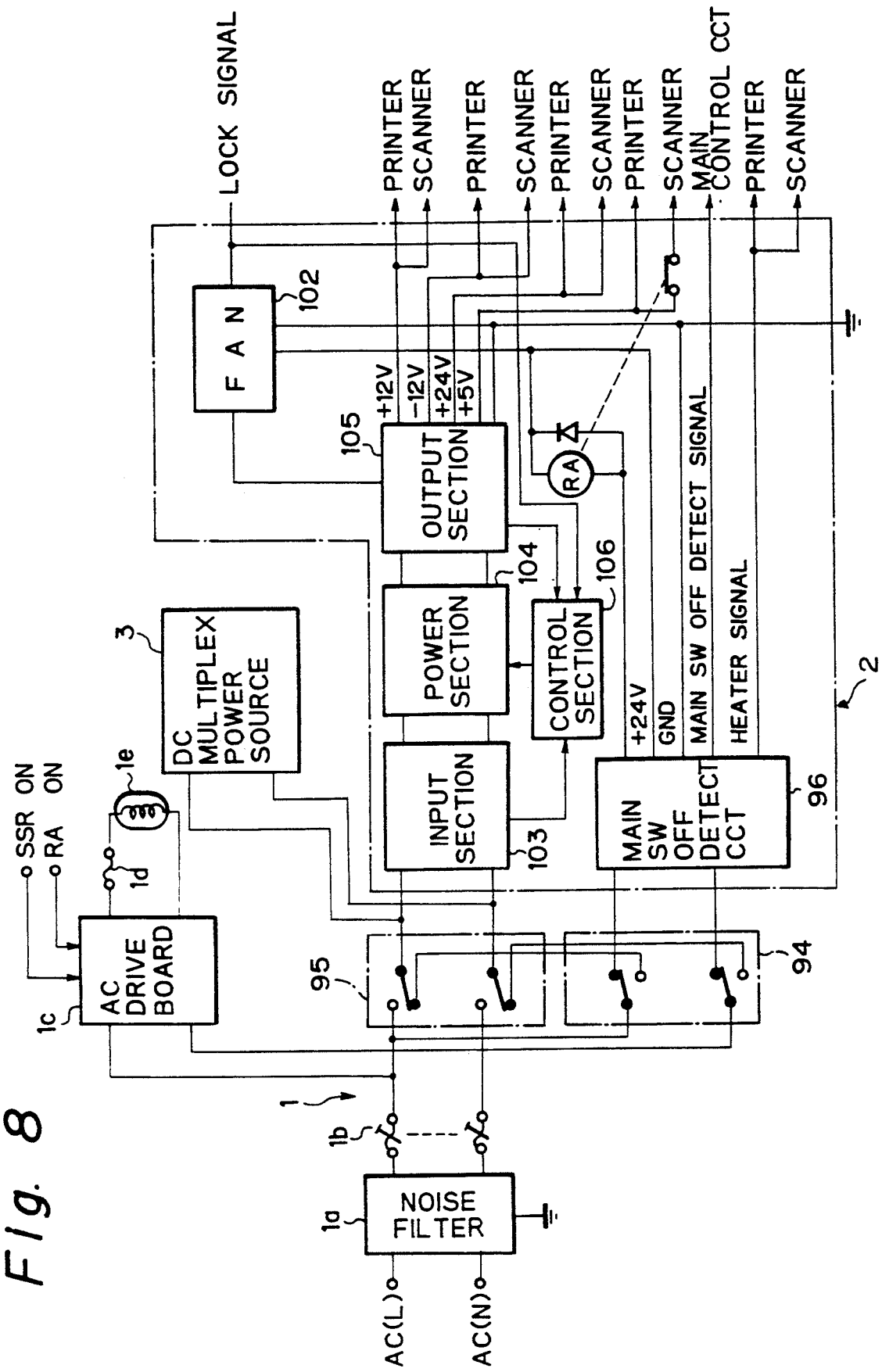
FIG. 8 is a block diagram schematically showing an alternative embodiment of the present invention.
Figure 9:
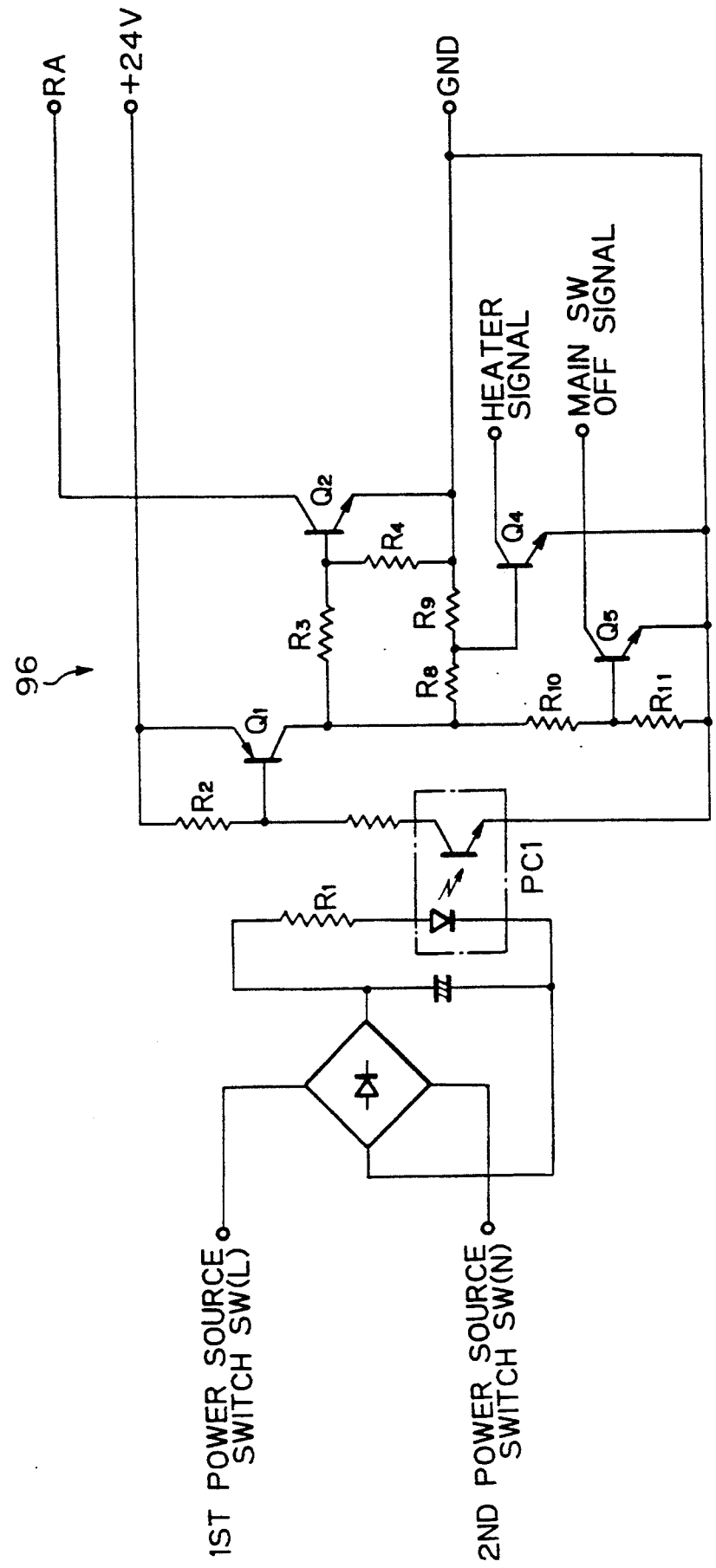
FIG. 9 is a circuit diagram showing a specific construction of a main switch OFF detecting circuit included in the embodiment of FIG. 8.

Referring to FIGS. 8 and 9, an alternative embodiment of the present invention will be described. This embodiment is identical with the previous embodiment regarding the construction of the multiplex digital copier (FIGS. 10-20). The embodiment which will be described is characterized by various means which are incorporated in a power source circuit shown in FIG. 8.

In the image forming apparatus having the DC copier power source 2, application extending section 6 capable of accommodating a facsimile function, and DC multiplex power source 3, a cooling fan 102 is built in the copy power source 2. The cooling fan 102 is implemented as a self-cooling fan for the copy power source 2. An input section 103, a power section 104, an output section 105 and a control section 106 are also incorporated in the copy power source 2. The input section 103 is made up of a line filter, an anti-rush current circuit, and a primary rectifying and smoothing circuit, although not shown in the figure. The power section 104 has a switching circuit and a transformer, not shown. The output section 105 has a secondary rectifying and smoothing circuit, not shown. The control section 106 has an output detecting circuit, a switching pulse width control circuit, and an error detecting circuit, not shown. A rectifier which generates heat is connected to the output of each of the various sections; the amount of heat changes with a change in the load. In the output section 105, the amount of heat differs from +5 V to +24 V, but it does not noticeably differ from +12 V to −12 V. In the input section 103, too, the amount of heat to be generated by the rectifier of the primary rectifying and smoothing circuit changes.

Temperature sensing means, fan rotation control means and power interrupting means, not shown, are also included in the DC copy power source 2. The temperature sensing means is responsive to the temperature of any the rectifiers. The fan rotation control means changes the rotation speed of the cooling fan 102 in matching relation to the sensed temperature. The power interrupting means interrupts at least the power supply to the rectifiers when the cooling fan 102 is deactivated. Further, the previously stated stop signal output control means feeds a stop signal to the main control circuit 20 on the deactivation of the cooling fan 102.

Specific operations of the above-stated means are as follows. By changing the rotation speed of the cooling fan 102 in response to a change in the amount of heat, it is possible to maintain the temperature inside the DC copy power source 2 below a predetermined level and, therefore, to set up a low rotation speed and low noise condition when the power consumption is low. Since the rotation speed of the cooling fan 102 can be changed on the basis of a change in the resistance of a thermistor, it is possible to rotate it at either of a constant low speed and a constant high speed if an adequate thermistor is selected. While the rectifier whose temperature should be sensed is preferably the rectifier associated with the primary rectifying and smoothing circuit, the embodiment selects the rectifier associated with the secondary rectifying and smoothing circuit for safety standard reasons. Regarding the rectifier on the secondary side, although the +5 V system is capable of coping with the night receive mode, it is +24 V that noticeably changes the load in the event of printing operation in the memory over condition. In light of this, an arrangement may be made such that while the fan 102 is usually rotated at a low speed matching +5 V, the rotation speed is controlled on the basis of the rectifier temperature associated with +24 V. This is successful in rotating the fan 102 at a high speed in the event of print-out ascribable to the memory over condition even at night.

When the rotation of the cooling fan 102 is stopped for some reason, it is likely that the DC copy power source 2 is damaged. On the stop of the fan 102, the fan 102 sends a fan lock signal to the control section 106. Then, the error detecting circuit included in the control section 106 interrupts the output thereof to thereby protect the power source 2 from damage. Alternatively, the stop of the output of the power source 2 may be delayed to send the fan lock signal to the main control circuit 20, allowing the circuit 20 to execute various kinds of control for safety purpose. For example, on receiving the fan lock signal, the main control circuit 20 may store it in a back-up memory to facilitate analysis which will be carried out afterwards. Further, in the night mode, it is possible to inform the transmitting station of the power source error.

As stated above, as the cooling fan 102 is incorporated in the DC copy power source 2 and the heat of the rectifier which changes with the load is sensed, cooling and noise can be controlled with considerable efficiency.

In summary, it will be seen that the present invention provides a multiplex image forming apparatus having various unprecedented advantages, as enumerated below.

(1) Detection signal output control means allows a detection signal to be sent to a control signal only when a second power source switch is turned on and a first power source switch is turned off. This allows a control circuit to select a minimum necessary operation.

(2) Anti-dew condensation means energizes an exclusive heater and thereby eliminates faulty images and paper jams ascribable to dew condensation.

(3) Power supply path interrupting means interrupts part of power source paths to thereby reduce the current which constantly flows. As a result, a power saving operation is readily achievable at night.

(4) User operation execution interrupting means inhibits the control circuit from executing control except for on-line control, thereby inhibiting drive loads and so forth from being turned on. This further promotes the power saving operation at night.

(5) The anti-dew condensation means is implemented by a heater operated by a DC-converted circuit and, therefore, does not cross AC power source lines. Hence, noise terminal voltage and similar noise are reduced.

(6) The power supply path interrupting means interrupts the power supply to the display of an operating section and other locations which the user can directly see, thereby eliminating the need for a special message informing the user of a night receive mode under way. Hence, a memory, for example, does not consume power at all to thereby enhance power saving.

(7) Second power supply path interrupting means interrupts, on the interruption of power supply to the control circuit, the power source of, for example, ±12 V in response to a signal appearing then. A DC power source, therefore, does not need many interrupting circuits thereinside. In addition, since interrupting circuits are located only at necessary positions, the layout and wiring are simplified.

(8) The power supply path interrupting means turns off a DC power source cooling device, thereby reducing noise at night.

(9) Night receive mode stop control means turns off a fixing heater, polygon motor and so forth at night except when needed, so that both the power consumption and the noise are reduced.

(10) Temperature sensing means and fan rotation control means cooperate to change the rotation speed of a cooling fan in matching relation to a load. This reduces noise in, for example, a night receive mode. Moreover, even in the night receive mode, the cooling fan is rotated at a high speed in the event when print-out is required due to a memory over condition, thereby achieving a sufficient cooling effect.

(11) When the cooling fan is brought to a stop by power supply interrupting means, the power is stopped to eliminate damage due to heat.

(12) Stop signal output control means delivers a fan lock signal to the control circuit to facilitate the analysis of an error mode which the control circuit executes.

(13) It is possible to detect the heat of a rectifier whose heat generation changes with a load and, therefore, to control cooling and noise with high efficiency.

Various modifications will become possible for those skilled in the art after receiving the teachings of the present disclosure without departing from the scope thereof.

What is claimed is:

1. A multiplex image forming apparatus comprising:
a power source for a copier;
an application extending section allowing a facsimile function to be combined with said image forming apparatus, and a power source for a multiplex configuration for driving said application extending section;

a first and a second power source switch located at an input section preceding said power source for a copier and said power source for a multiplex configuration;

a detecting circuit connecting to said first power source switch for detecting turn-on and turn-off of said first power source switch; and detection signal output control means for outputting a detection signal fed from said detecting circuit only when said second power source switch is turned on and said first power source switch is turned off.

2. An apparatus as claimed in claim 1, further comprising user operation execution interrupting means for interrupting execution of control relating to user's manipulation except for on-line control.

3. An apparatus as claimed in claim 1, further comprising night receive mode interruption control means responsive to the detection signal from said detection signal output control means for disabling at least a fixing heater and rotary members included in said apparatus except when a printing operation is needed at night.

4. A multiplex image forming apparatus comprising:
a power source for a copier;
an application extending section capable of combining a facsimile function with said apparatus, and a power source for a multiplex configuration for driving said application extending section;
a first and second switch located at an input section preceding said power source for a copier and said power source for a multiplex configuration; and
anti-dew condensation means operable only when said second power source switch is turned on and said first power source switch is turned off.

5. An apparatus as claimed in claim 4, wherein said anti-dew condensation means comprises a heater operated by a DC-converted circuit.

6. A multiplex image forming apparatus comprising:
a power source for a copier;
an application extending section capable of combining a facsimile function with said apparatus, and a power source for a multiplex configuration for driving said application extending section;
a first and a second switch located at an input section preceding said power source for a copier and said power source for a multiplex configuration; and
power supply path interrupting means for interrupting part of power supply paths only when said second power switch is turned on and said first power source switch is turned off.

7. An apparatus as claimed in claim 6, wherein said power supply path interrupting means interrupts power supply paths provided in a document handling section, a document reading section, and a user-oriented operating section included in said apparatus.

8. An apparatus as claimed in claim 6, further comprising second power supply path interrupting means for interrupting, when said power supply path interrupting means interrupt part of the power supply paths, other power supply paths.

9. An apparatus as claimed in claim 6, wherein said power supply path interrupting means turns off a DC power source cooling device included in said apparatus.

10. A multiplex image forming apparatus comprising:
a power source for a copier;
an application extending section capable of combining a facsimile function with said apparatus, and a power source for a multiplex configuration for driving said application extending section;
a cooling fan included in said power source of a copier;
a heat generating member whose heat generating state changes;
temperature detecting means for detecting a temperature of said heat generating member; and
fan rotation speed control means for changing a rotation speed of said cooling fan in matching relation to the temperature detected by said temperature detecting means.

11. An apparatus as claimed in claim 10, further comprising power supply interrupting means for interrupting power supply to said heat generating member at least when the operation of said cooling fan is stopped.

12. An apparatus as claimed in claim 11, further comprising stop signal output control means for outputting a stop signal when the rotation of said cooling fan is stopped.

13. An apparatus as claimed in claim 11, wherein said heat generating member is incorporated in said power source for a copier, said cooling fan being implemented as a self-cooling fan of said power source for a copier.

* * * * *